United States Patent
Lee et al.

(10) Patent No.: US 12,356,314 B2
(45) Date of Patent: Jul. 8, 2025

(54) BEAM SEARCH METHOD AND APPARATUS IN SMART REPEATER SYSTEM

(71) Applicant: Electronics and Telecommunications Research Institute, Daejeon (KR)

(72) Inventors: An Seok Lee, Daejeon (KR); Heesoo Lee, Daejeon (KR); Seung Jae Bahng, Daejeon (KR); Jung Sook Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 17/994,914

(22) Filed: Nov. 28, 2022

(65) Prior Publication Data
US 2023/0171675 A1   Jun. 1, 2023

(30) Foreign Application Priority Data

Nov. 29, 2021  (KR) .................. 10-2021-0167267
Sep. 28, 2022  (KR) .................. 10-2022-0122941

(51) Int. Cl.
*H04W 48/08*   (2009.01)
*H04B 7/06*    (2006.01)
(Continued)

(52) U.S. Cl.
CPC .......... *H04W 48/08* (2013.01); *H04B 7/0695* (2013.01); *H04B 7/15* (2013.01); *H04W 16/28* (2013.01)

(58) Field of Classification Search
CPC ... H04W 48/08; H04W 16/28; H04W 84/047; H04B 7/15; H04B 7/06952; H04B 7/15507; H04B 7/0695
See application file for complete search history.

(56) References Cited

U.S. PATENT DOCUMENTS 10,791,576 B2    9/2020  Yoon et al.
2019/0288766 A1*  9/2019  Ng .................... H04B 7/0695
(Continued)

FOREIGN PATENT DOCUMENTS

| KR | 10-2237660 | * | 4/2021 | ........ H04W 56/001 |
| WO | 2020/171405 |  | 8/2020 |  |
| WO | 2021/187933 |  | 9/2021 |  |

OTHER PUBLICATIONS

Kim et al., Implementation of SDR-based 5G NR Cell Search Equipment, Published in: 2020 22nd International Conference on Advanced Communication Technology (ICACT) Feb. 16, 2020.*

*Primary Examiner* — Meng Vang
*Assistant Examiner* — Ayodele Lawrence Olubodun
(74) *Attorney, Agent, or Firm* — KILE PARK REED & HOUTTEMAN PLLC

(57) ABSTRACT

An operation method of a first device in a communication system may comprise: receiving, at a second device, a primary synchronization signal block (SSB) including first SSBs for the first device; feeding back to the second device an index of a first SSB with a highest received signal strength among the first SSBs of the first SSB set; receiving, at the second device, a second SSB set including the first SSBs for the first device and second SSBs for a third device; transmitting to the third device the second SSBs for the third device in the second SSB set; and forwarding an index of a second SSB with a highest received signal strength among the second SSBs to the second device, the index being received from the third device.

9 Claims, 19 Drawing Sheets

(51) Int. Cl.
  *H04B 7/15* (2006.01)
  *H04W 16/28* (2009.01)

(56) References Cited

U.S. PATENT DOCUMENTS

| | | |
|---|---|---|
| 2020/0169347 A1 | 5/2020 | Cho et al. |
| 2020/0196225 A1 | 6/2020 | Wang et al. |
| 2020/0288359 A1 | 9/2020 | Kim |
| 2020/0412434 A1* | 12/2020 | Zhu .................... H04J 11/0069 |
| 2021/0006986 A1* | 1/2021 | Zhu .................... H04W 72/046 |
| 2021/0036764 A1 | 2/2021 | Li et al. |
| 2021/0067237 A1 | 3/2021 | Sampath et al. |
| 2021/0067978 A1* | 3/2021 | Cheraghi ............. H04B 17/336 |
| 2021/0296761 A1 | 9/2021 | Lee et al. |
| 2021/0337494 A1* | 10/2021 | Ye ......................... H04L 5/0096 |
| 2021/0392679 A1 | 12/2021 | Kim et al. |
| 2022/0053433 A1* | 2/2022 | Abedini ................ H04L 5/0051 |
| 2023/0189177 A1* | 6/2023 | Chen .................... H04B 7/0626 |
| | | 370/503 |

* cited by examiner

BEAM SEARCH METHOD AND APPARATUS IN SMART REPEATER SYSTEM

CROSS-REFERENCE TO RELATED APPLICATIONS

This application claims priority to Korean Patent Applications No. 10-2021-0167267, filed on Nov. 29, 2021, and No. 10-2022-0122941, filed on Sep. 28, 2022, with the Korean Intellectual Property Office (KIPO), the entire contents of which are hereby incorporated by reference.

BACKGROUND

1. Technical Field

The present disclosure relates to a beam search technology in a smart repeater system, and more particularly, to a beam search technology in a smart repeater system that is capable of allowing a smart repeater to select the best one of a plurality of beams to relay a received signal.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

A smart repeater may be used to expand communication coverage in a communication system. Such a smart repeater may include a beamforming function unlike the existing radio frequency (RF) repeater. As a result, the smart repeater may select the best one of a plurality of beams to relay the signal received from a base station or a terminal. Accordingly, there is a need for a method for allowing the smart repeater to select the best one of a plurality of beams to relay a signal received from a base station or a terminal.

SUMMARY

The present disclosure has been conceived to solve the above problems, and it is an object of the present disclosure to provide a beam search method and apparatus in a smart repeater system that is capable of allowing the smart repeater to select the best one of a plurality of beams to relay a signal received from a base station or a terminal.

According to a first exemplary embodiment of the present disclosure, an operation method of a first device in a communication system may comprise: receiving, at a second device, a primary synchronization signal block (SSB) including first SSBs for the first device; feeding back to the second device an index of a first SSB with a highest received signal strength among the first SSBs of the first SSB set; receiving, at the second device, a second SSB set including the first SSBs for the first device and second SSBs for a third device; transmitting to the third device the second SSBs for the third device in the second SSB set; and forwarding an index of a second SSB with a highest received signal strength among the second SSBs to the second device, the index being received from the third device.

The first device may receive from the second device the second SSBs for the third device through a beam corresponding to the index of the first SSB.

The second SSBs may be transmitted to the third device using different beams.

The method may further comprise transmitting, at the first device, the second SSBs to the third device using different beams and an SSB having the index of the first SSB among the first SSBs to the third device using one of the beams.

The method may further comprise transmitting, at the first device, the second SSBs to the third device using different beams and the first SSBs to the third device using one of the beams.

The first device may be a first smart repeater, the second device may be at least one of a base station or a second smart repeater, and the third device may be at least one of a third smart repeater or a terminal.

According to a second exemplary embodiment of the present disclosure, an operation method of a base station in a communication system may comprise: transmitting a first primary synchronization signal block (SSB) set including first primary SSBs to a first device; receiving from the first device an index of a first primary SSB with a highest received signal strength of the first device among the first primary SSBs of the first primary SSB set; transmitting a second primary SSB set including the first primary SSBs and second primary SSBs for a second device to the first device; receiving from the first device an index of a second primary SSB with a highest received signal strength among the second primary SSBs; identifying a direction of a first best beam toward the first device using the index of the first primary SSB; and identifying a direction of a second best beam toward the second device using the index of the second primary SSB.

The second primary SSB sets may further comprise second secondary SSBs for a fourth device, and the method may further comprise: transmitting the first primary SSB set including the first primary SSBs to a third device; receiving an index of a first secondary SSB with a highest received signal strength of the third device among the first primary SSB set including the first primary SSBs; transmitting the first primary SSBs and the second primary SSB set to the third device; receiving from the third device an index of a second secondary SSB with a highest received signal strength among the second secondary SSBs; identifying a third best beam toward the third device using the index of the first secondary SSB; and identifying a fourth best beam toward the fourth device using the index of the second secondary SSB.

The method may further comprise: transmitting to the third device the first primary SSB set including the first primary SSBs; receiving from the third device an index of a first tertiary SSB with a highest received signal strength of the third device among the first primary SSBs of the first primary SSB set; transmitting to the third device a second secondary SSB set including the first primary SSBs and the second secondary SSBs for the fourth device; receiving from the third device an index of a second tertiary SSB with the highest received signal strength among the second secondary SSB; identifying a direction of a fifth best beam toward the third device using the index of the first tertiary SSB; and identifying a direction of a sixth best beam toward the fourth device using the index of the second tertiary SSB.

The second primary SSB set and the second secondary SSB set may be transmitted at the same SSB set interval in different frequency bands.

According to the present application, it is possible for a smart repeater to select the best one of a plurality beams and relay a signal received from a base station or a terminal in a smart repeater system having a dual structure supporting base station beamforming and smart repeater beamforming. According to the present application, it is also possible to extend communication coverage by allowing a smart repeater to select the best one of a plurality of beams.

According to the present application, it is also possible for a base station to transmit synchronization signal blocks (SSBs), which is to be broadcast to a terminal via a smart repeater, to the smart repeater through the best base station beam. According to the present application, it is also possible for a smart repeater to receive SSBs from a base station through the best beam and relay the SSBs to a terminal through a plurality of beams.

DETAILED DESCRIPTION OF THE EMBODIMENTS

Figure 1:
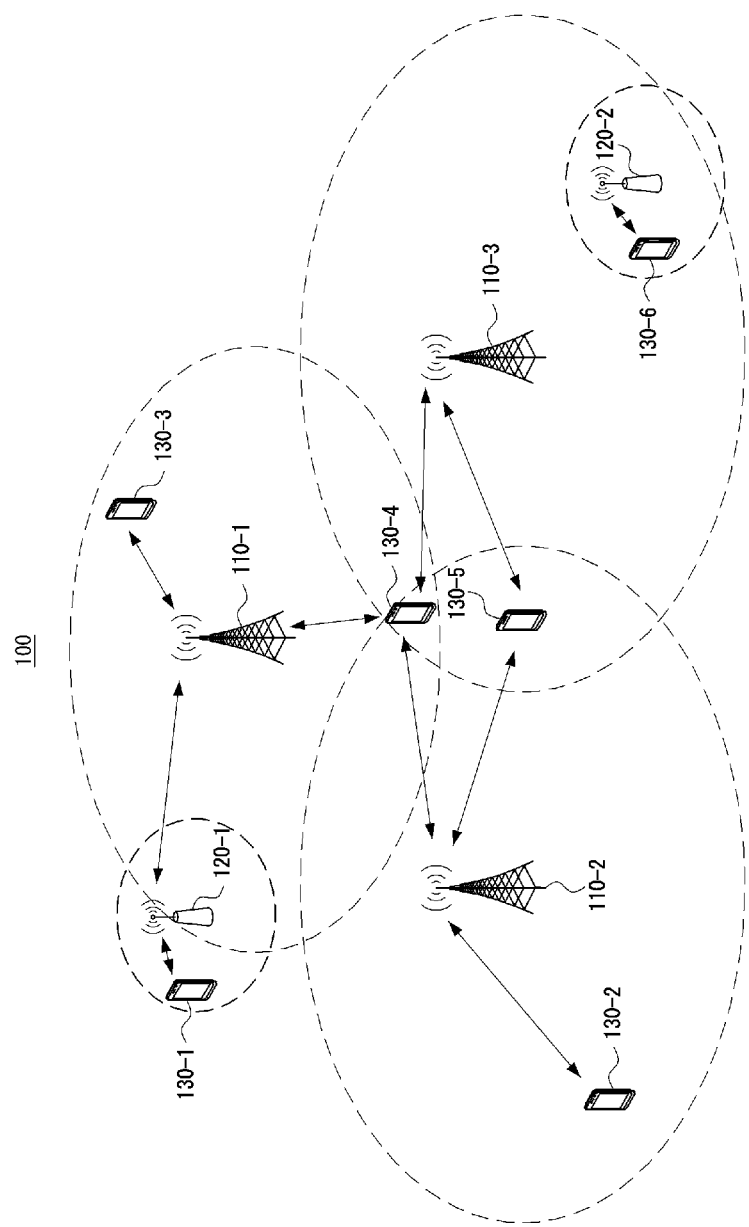
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
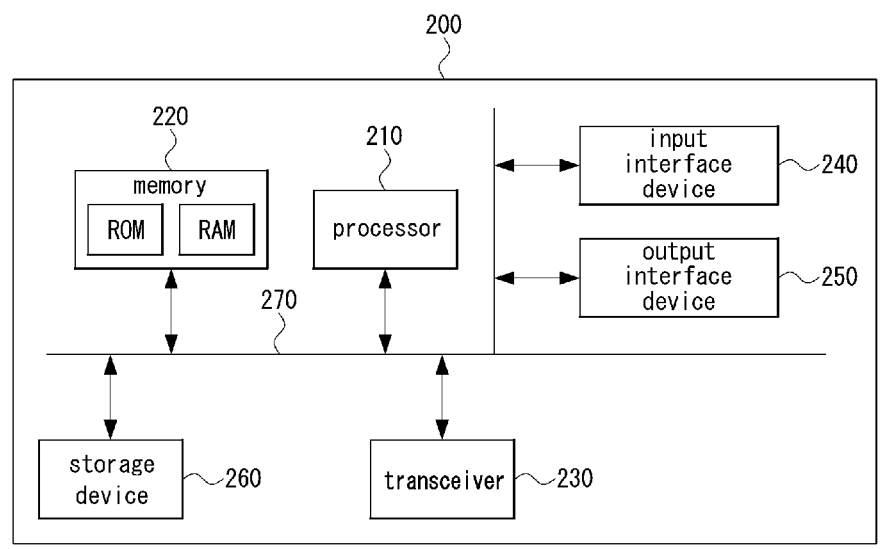
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, such a communication system may need to increase radio transmission capacity by using high-frequency bands such as millimeter wave (mmWave) and terahertz (THz) due to the lack of available low-frequency bands and increase of traffic amount and the number of mobile devices. In the case of a communication system using the millimeter wave or terahertz, the communication signals suffer from high pass loss as the propagation distance increases due to the nature of the frequency band. In order to overcome these shortcomings, it is essential for such a high frequency communication system to adopt beamforming.

In particular, the 5th generation (5G) communication system may adopt a beamforming technology to ensure stable performance by extending the signal reach of a high frequency band. However, in the initial access process during which the base station does not know the location of the terminal, it is possible to use a method the base station transmits synchronization and control signals for initial access in various directions and the terminal receiving the signals selects the best beam to report. As such, when the communication system supports beamforming to concentrate a signal in a specific direction, the base station can select the best beam in the direction to the location of the terminal for communication.

Accordingly, a beam search process may be necessary for the base station to find out the best beam for the terminal when the terminal attempts initial access. Therefore, the base station may transmit a synchronization signal block (SSB) signal periodically in order for terminals to achieve synchronization with the base station. In addition, the base station may provide the terminal with basic system information for initial access to the terminal by transmitting the SSB signal periodically.

Figure 3:
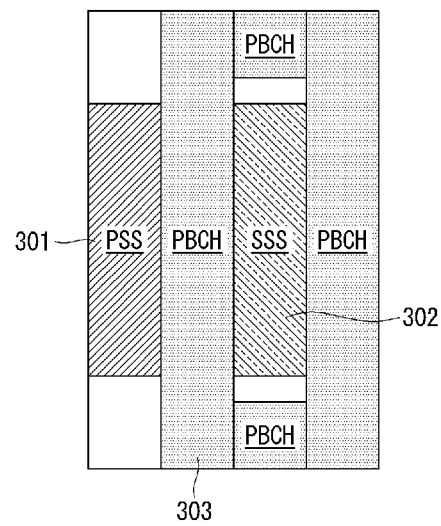
FIG. 3 is a conceptual diagram illustrating the first embodiment of a synchronization signal block (SSB).

FIG. 3 is a conceptual diagram illustrating the first embodiment of a synchronization signal block (SSB).

With reference to FIG. 3, the SSB may occupy four orthogonal frequency division multiplexing (OFDM) symbols and include a primary synchronization signal (PSS) 301, a secondary synchronization signal (SSS) 302, and a physical broadcast channel (PBCH) 303. Here, the PSS 301 may be generated by an m-sequence and mapped to 127 subcarriers of the first symbol. In addition, the SSS 302 may be generated by a gold sequence and mapped to 127 subcarriers of the third symbol. The PBCH 303 may be mapped to a total of 576 subcarriers, i.e., 528 subcarriers of the second and fourth symbols and 48 subcarriers of the third symbol. The PBCH 303 may also include a demodulation reference signal (DMRS) in every four subcarriers.

Figure 4:
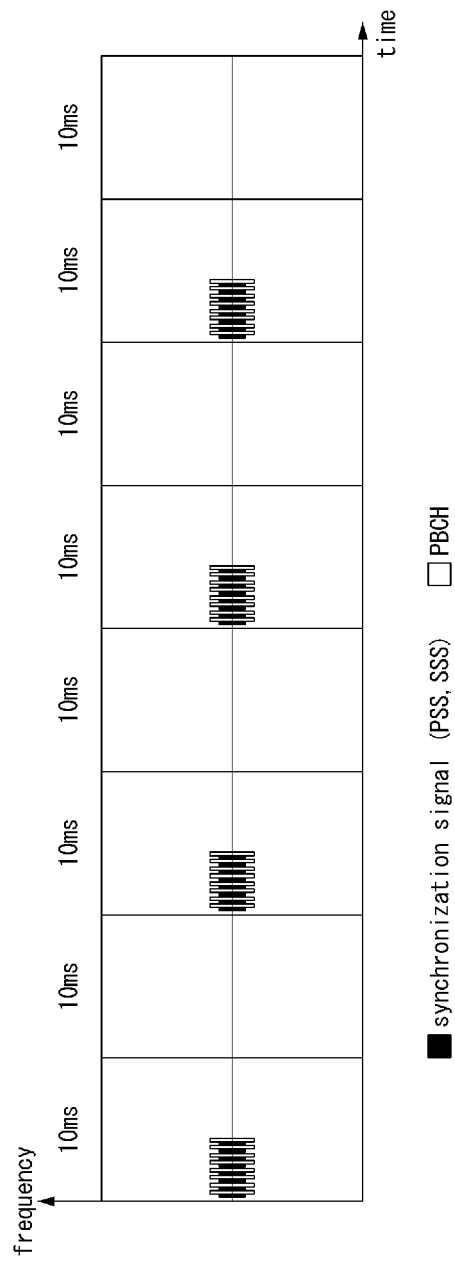
FIG. 4 is a conceptual diagram illustrating the first embodiment of SSB signals being transmitted periodically.

FIG. 4 is a conceptual diagram illustrating the first embodiment of SSB signals being transmitted periodically.

With reference to FIG. 4, one or more SSBs may be included in the form of a burst within a window having a length of 5 milliseconds (ms), and a burst set of these SSBs may be transmitted periodically in a specific subcarrier of the entire 5G New Radio (NR) OFDM frame. The SSBs in the burst set may have unique indices so as not to overlap each other in the time domain and may be sequentially transmitted. The SSB burst set may be repeated every 20 ms by way of example.

Figure 5:
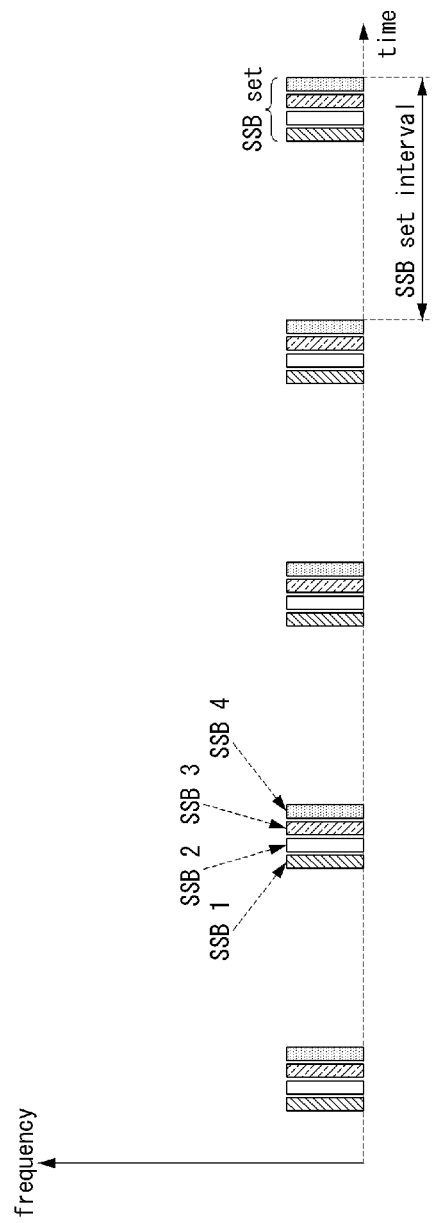
FIG. 5 is a conceptual diagram illustrating the first embodiment of SSB sets being periodically transmitted.

FIG. 5 is a conceptual diagram illustrating the first embodiment of SSB sets being periodically transmitted.

With reference to FIG. 5, SSB1 to SSB4 may constitute an SSB set. This SSB burst set may be transmitted periodically. The SSB set transmission interval may be set to one of 5 ms, 10 ms, 20 ms, 40 ms, 80 ms, or 160 ms.

Figure 6:
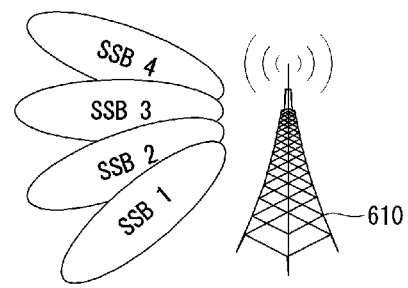
FIG. 6 is a conceptual diagram illustrating the first embodiment of a method for a base station to transmit SSB signals.

FIG. 6 is a conceptual diagram illustrating the first embodiment of a method for a base station to transmit SSB signals.

With reference to FIG. 6, the base station 610 may transmit SSB signals (i.e., SSB1 to SSB4) having different indices through beams in each direction. Then, the terminal may receive SSB signals each having a different index. Next, the terminal may measure the received signal strengths of the received SSB signals. Thereafter, the terminal may transmit feedback with the index of the SSB signal having the highest received signal strength to the base station. Then, the base station can know the best beam for the terminal by receiving the index of the SSB signal having the highest received signal strength from the terminal. This process in which the base station 610 transmits SSB signals to the terminal and receives feedback to select the best beam may be referred to as a beam search process.

As such, in the beam search process, a set of SSBs may be transmitted at a predetermined interval. Here, the number of SSBs in the SSB set may be determined according to the number of beams supported by the base station. Therefore, the terminal may receive SSBs transmitted through various beams while one SSB set is transmitted. The terminal may also measure the received signal strength of the SSBs. The terminal may also inform the base station of the index of the SSB having the highest received signal strength among the SSBs, i.e., the beam index. Accordingly, the base station may receive the index of the SSB having the highest received signal strength from the terminal and exchange data with the corresponding terminal through the best beam corresponding to the index.

Meanwhile, a recent communication system may use a smart repeater to extend communication coverage. Such a smart repeater may use a beamforming function unlike the existing radio frequency (RF) repeater. As a result, the smart repeater may select the best one of a plurality of beams to relay the signal received from a base station or a terminal. Accordingly, there is a need for a method of allowing the smart repeater to select the best one of a plurality of beams to relay a signal received from a base station or a terminal. For this purpose, the base station may perform transmission/reception control and optimal beam management via control signals.

Figure 7:
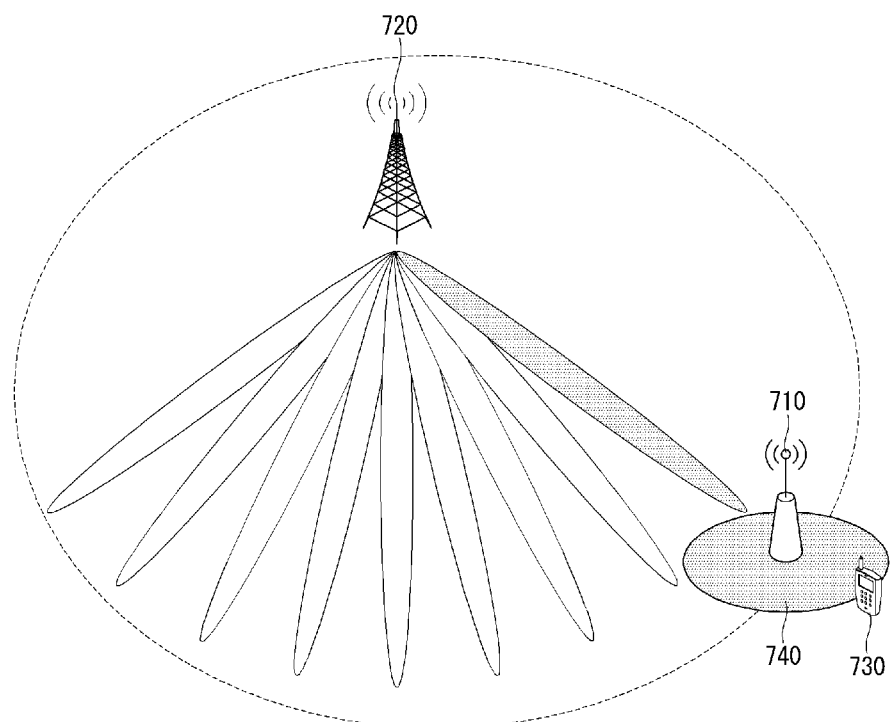
FIG. 7 is a conceptual diagram illustrating the first embodiment of a relay process of a radio frequency (RF) repeater.

FIG. 7 is a conceptual diagram illustrating the first embodiment of a relay process of a radio frequency (RF) repeater.

With reference to FIG. 7, the RF repeater 710 with no beamforming function may relay signals by way of amplifying a signal received from the base station 720 and transmitting the amplified signal to the terminal 730 using a fixed beam 740. The RF repeater 710 with no beamforming function may also relay signals by way of amplifying a signal received from the terminal 730 and transmitting the amplified signal to the base station using the fixed beam 740. As such, the RF repeater 710 may operate without distinction between the uplink and the downlink of the base station 720. As described above, the RF repeater 710 may amplify and transmit a signal received from the base station 720 or the terminal 730.

Figure 8:
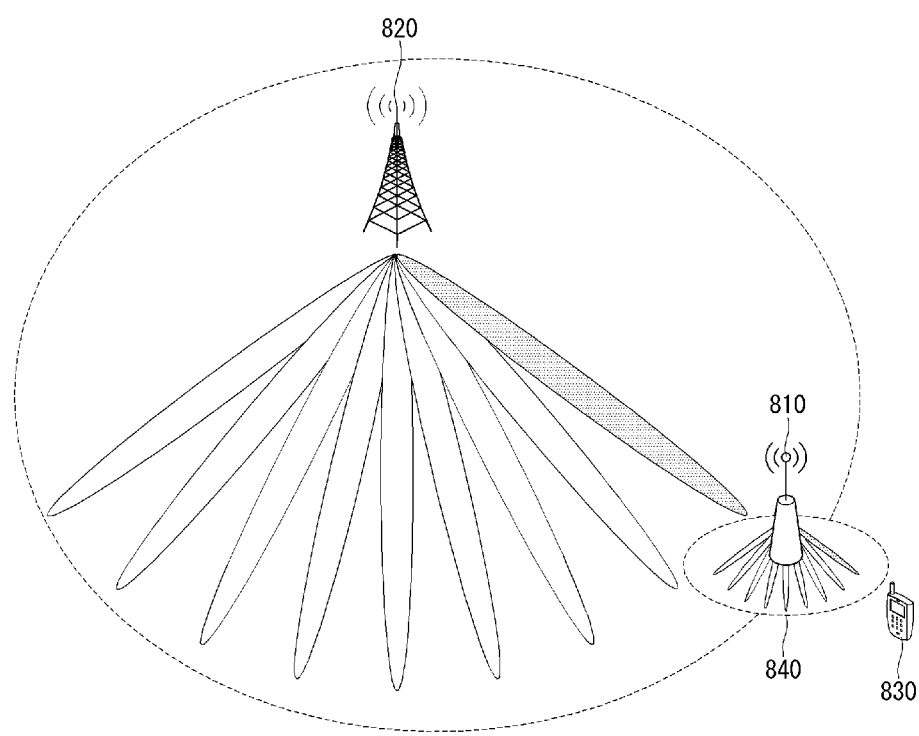
FIG. 8 is a conceptual diagram illustrating the first embodiment of a relaying process of a smart repeater.

FIG. 8 is a conceptual diagram illustrating the first embodiment of a relaying process of a smart repeater.

With reference to FIG. 8, the smart repeater 810 supporting a beamforming function may relay signals by way of amplifying and transmitting a signal received from the base station 820 to the terminal 830 using the best beam 840. The smart repeater 810 may also relay signals by way of amplifying and transmitting a signal received from the terminal 830 to the base station 820 using the best beam (not shown). As such, the smart repeater 810 may control beams according to circumstances and transmit signals by distinguishing between downlink and uplink. Therefore, the smart repeater 810 may have separate control links for time division duplex (TDD) uplink/downlink control, data path on/off control, and terminal-specific beam control. The smart repeater 810 may also include the basic functions of a terminal.

In the present disclosure, the smart repeater may use only some of the available beams. The smart repeater may determine the number of beams to use and the total number of available beams and transmit information on the numbers to the base station such that the base station becomes aware of the numbers.

Figure 9:
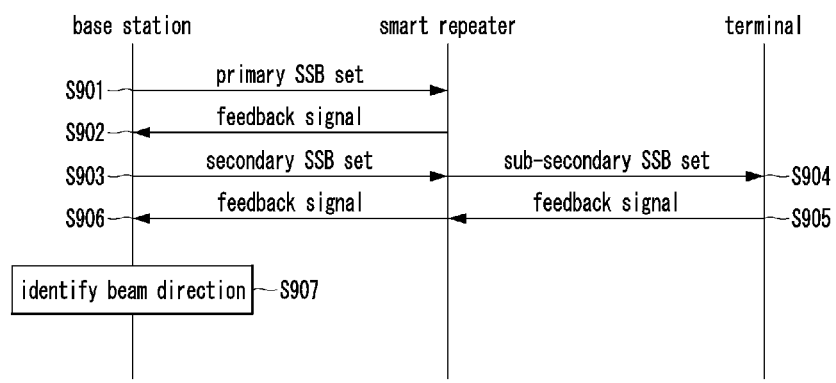
FIG. 9 is a signal flow diagram illustrating the first embodiment of a beam search method in a smart repeater system.

FIG. 9 is a signal flow diagram illustrating the first embodiment of a beam search method in a smart repeater system.

With reference to FIG. 9, in the beam search method, a base station may sequentially transmit, at step S901, a primary SSB set composed of SSB 1 to SSB N signals in N beam directions using N beams during a primary SSB set transmission period. Here, N may be a positive integer. Accordingly, the smart repeater may receive N beams including SSB 1 to SSB N from the base station and measure the received signal strength of each beam.

Figure 10:
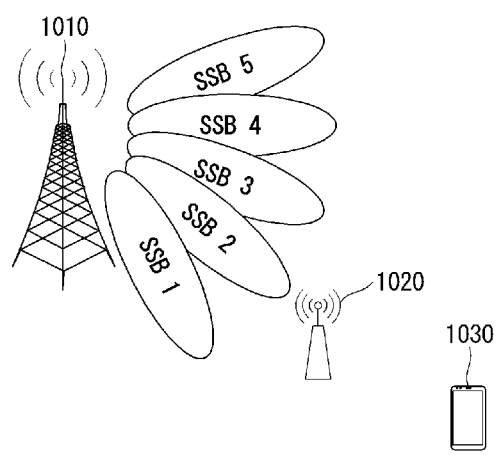
FIG. 10 is a conceptual diagram illustrating the first embodiment of a primary SSB set transmission process in FIG. 9.

FIG. 10 is a conceptual diagram illustrating the first embodiment of a primary SSB set transmission process in FIG. 9.

With reference to FIG. 10, a base station 1010 may sequentially transmit a primary SSB set composed of SSB 1 to SSB 5 signals in 5 beam directions using five beams during a primary SSB set transmission period. Accordingly, the smart repeater 1020 may receive 5 beams including SSB 1 to SSB 5 from the base station 1010 and measure the received signal strength of each beam. Here, the smart repeater 1020 may obtain index 3 of the SSB in the third beam having the highest received signal strength.

With reference back to FIG. 9, the smart repeater may receive N beams of SSB 1 to SSB N from the base station, measure the received signal strength of each beam, acquire the SSB index in the beam having the highest received signal strength, and feeds back the SSB index to the base station at step S902. Then, the base station may receive the SSB index having the highest received signal strength at the smart repeater. Accordingly, the base station may recognize the beam carrying the corresponding SSB index as the best beam (i.e., the best base station beam). In this manner, the smart repeater may repeatedly perform the process of searching for the best beam at regular intervals.

Figure 11:
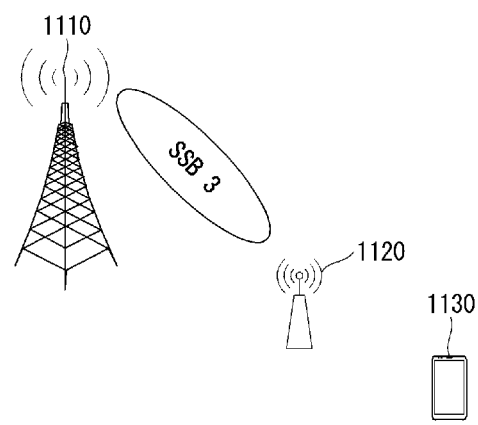
FIG. 11 is a conceptual diagram illustrating the first embodiment of a feedback signal transmission process in FIG. 9.

FIG. 11 is a conceptual diagram illustrating the first embodiment of a feedback signal transmission process in FIG. 9.

In the feedback signal transmission process of FIG. 11, the smart repeater 1120 may receive five beams including SSB 1 to SSB 5 from the base station 1110, measure the received signal strength of each beam, acquire the SSB index of 3 in the beam having the highest received signal strength, and feeds back the index to the base station 1120. Then, the base station 1110 may receive the SSB index having the highest received signal strength from the smart repeater 1110. Accordingly, the base station 1110 may recognize the beam carrying the corresponding SSB index as the best beam (i.e., the best base station beam). As such, the smart repeater 1120 may repeatedly perform a process of searching for the best beam at regular intervals.

With reference back to FIG. 9, after finding the best beam in the direction of the smart repeater, the base station may increase the number of SSBs by M, by way of example, during the transmission period of the secondary SSB set and transmit the secondary SSB set composed of N+M SSBs to the smart repeater at step S903. Here, M may be a positive integer. In this case, the base station may sequentially transmit N SSBs toward the smart repeater using N beams. The base station may also transmit all the remaining M SSBs toward the smart repeater through the best beam. That is, the base station may transmit the first N SSBs using beams in different directions and the remaining M SSBs using the best beam. Then, after receiving N+M SSBs, the smart repeater may transmit a sub-secondary SSB set composed of M SSBs toward the terminal through M beams in different directions at step S904. The processes of S903 and S904 may be referred to as an SSB relay process.

Here, the base station may inform the smart repeater and the terminal in advance that the beams with the first N initial SSBs are transmitted to the smart repeater and the beams with the latter M SSBs are transmitted to the terminal via the smart repeater. To this end, the base station may include information about N and M in a master information block (MIB) or system information block (SIB) broadcast toward the smart repeater and the terminal. Meanwhile, even if it is close to the smart repeater and far from the base station, if the terminal can connect to the base station directly, direct connection to the base station may be advantageous in various aspects such as transmission delay and entire network complexity. That is, the terminal may access the smart repeater when it is difficult to directly connect to the base station.

Meanwhile, when there is an SSB received with a received signal strength equal to or greater than a predetermined threshold among the N SSBs in the first half of the beam search process of the smart repeater, even if the M SSBs in the second half are received with higher received signal strengths, the smart repeater may select one of the N SSBs received in the first half. Through this, the smart repeater may guarantee priority for access to the base station. The smart repeater may also select an SSB beam through the smart repeater when the received signal strength of the latter M SSBs is greater than the received signal strength of the first N SSBs by at least a predetermined difference value. To this end, the base station may include predetermined threshold value information in a master information block (MIB) or system information block (SIB) broadcast toward the smart repeater.

Similarly, the beam search operation of the terminal may be performed by way of comparing the received signal strength of the SSB received with the highest power among the N SSBs in the first half and the received signal strength of the SSB received with the highest power among the M SSBs in the latter half and, selecting, when the received signal strength of the SSB with the highest signal strength among the M of the latter half is greater than the received signal strength of the SSB with the highest power among the N SSBs of the first half by a predetermined difference value (Difference), the SSB beam through the smart repeater. To this end, the base station may include predetermined difference value information in a master information block (MIB) or system information block (SIB) broadcast toward the terminal.

Figure 12:
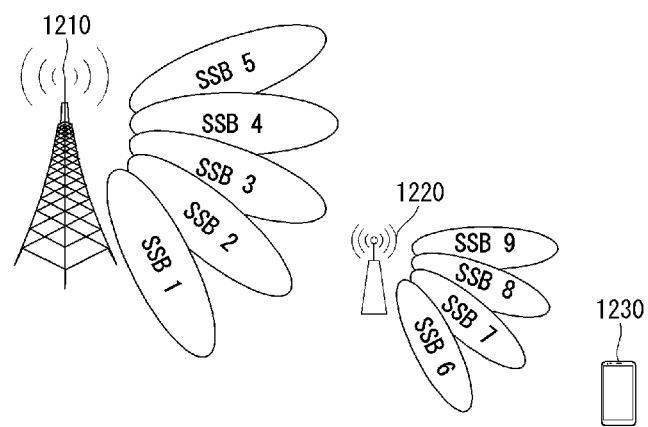
FIG. 12 is a conceptual diagram illustrating the first embodiment of the SSB relay process in FIG. 9.

FIG. 12 is a conceptual diagram illustrating the first embodiment of the SSB relay process in FIG. 9.

With reference to FIG. 12, in the SSB relay process, after finding the optimal base station beam in the direction of the smart repeater, the base station 1210 may increase the number of SSBs by 4 and may transmit a secondary SSB set composed of 9 SSBs to the smart repeater 1220. Here, SSB1 to SSB 5 may be transmitted in the first to fifth beams, respectively, and then four SSBs of SSB 6 to SSB 9 may be transmitted in the optimal base station beam. That is, the base station 1210 may transmit the first 5 SSBs through beams in different directions. In addition, the base station 1210 may transmit the remaining four SSBs, although they have different indices, through the beam fixed in the direction of the smart repeater 1220. Meanwhile, the smart repeater 1220 may transmit the remaining SSBs through the first to fourth smart repeater beams. That is, the smart repeater 1220 may transmit SSB 6 in the first smart repeater beam, SSB 7 in the second smart repeater beam, SSB 8 in the third smart repeater beam, and SSB 9 in the fourth smart repeater beam.

With reference back to FIG. 9, after finding the best beam in the direction of the smart repeater, the base station may increase the number of SSBs by M−1, by way of another example, during the transmission period of the secondary SSB set and transmit the secondary SSB set composed of N+M−1 SSBs at step S903. In this case, the base station may sequentially transmit N SSBs toward the smart repeater using N beams. The base station may also transmit all the remaining M−1 SSBs toward the smart repeater through the best beam. That is, the base station may transmit the first N SSBs using beams in different directions and the remaining M−1 SSBs using the best beam. Then, after receiving N+M−1 SSBs, the smart repeater may transmit a sub-secondary SSB set composed of M SSBs received through the best beam toward the terminal through M beams in different directions at step S904.

Figure 13:
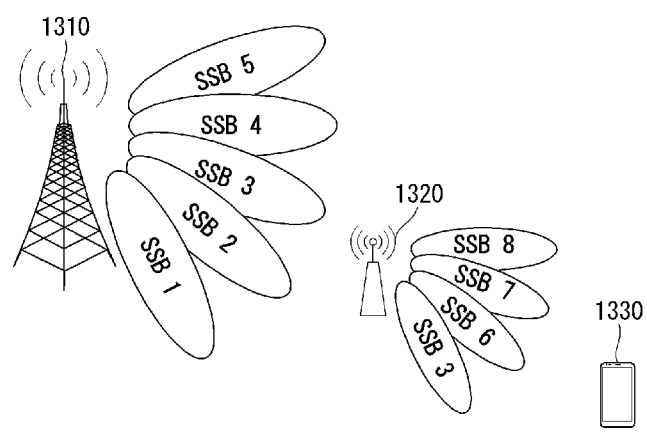
FIG. 13 is a conceptual diagram illustrating the second embodiment of the SSB relay process in FIG. 9.

FIG. 13 is a conceptual diagram illustrating the second embodiment of the SSB relay process in FIG. 9.

With reference to FIG. 13, in the SSB relay process, after finding the optimal base station beam in the direction of the smart repeater, the base station 1310 may increase the number of SSBs by three and may transmit a secondary SSB set composed of 8 SSBs to the smart repeater 1320. Here, SSB1 to SSB 5 may be transmitted in the first to fifth beams, respectively, and then three SSBs of SSB 6 to SSB 8 may be transmitted in the optimal base station beam. That is, the base station 1310 may transmit the first 5 SSBs through beams in different directions. In addition, the base station 1310 may transmit SSB 3 and the remaining three SSBs of SSB 6 to SSB8, although they have different indices, in the beam actually fixed in the direction of the smart repeater 1320. Meanwhile, the smart repeater 1320 may transmit SSB3 and the remaining SSBs of SSB 6 to SSB 8 through the first to fourth smart repeater beams. That is, the smart repeater 1320 may transmit SSB 3 in the first smart repeater beam, SSB 6 in the second smart repeater beam, SSB 7 in the third smart repeater beam, and SSB 8 in the fourth smart repeater beam.

With reference back to FIG. 9, after finding the best beam in the direction of the smart repeater, the base station may increase the number of SSBs by M−1, by way of another example, during the transmission period of the secondary SSB set and transmit the secondary SSB set composed of N+M−1 SSBs at step S903. In this case, the base station may sequentially transmit N SSBs toward the smart repeater using N beams. The base station may also transmit all the remaining M−1 SSBs toward the smart repeater through the best beam. That is, the base station may transmit the first N SSBs using beams in different directions and the remaining M−1 SSBs using the best beam. Then, after receiving N+M−1 SSBs, the smart repeater may transmit the N SSBs to the terminal through the first beam and the M−1 SSBs sequentially to the terminal through M−1 beams in different directions at step S904.

Figure 14:
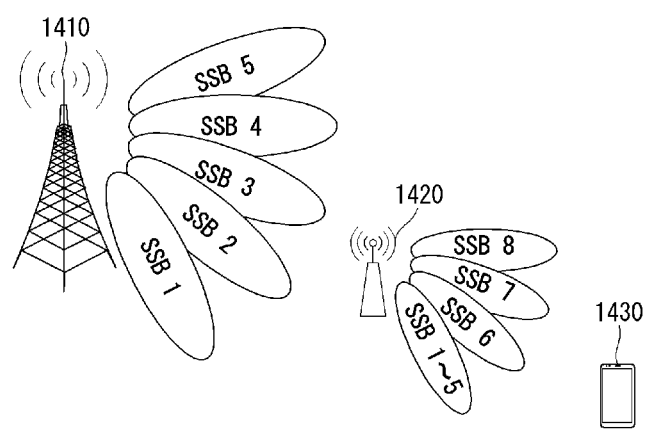
FIG. 14 is a conceptual diagram illustrating the third embodiment of the SSB relay process in FIG. 9.

FIG. 14 is a conceptual diagram illustrating the third embodiment of the SSB relay process in FIG. 9.

With reference to FIG. 14, in the SSB relay process, after finding the optimal base station beam in the direction of the smart repeater, the base station 1410 may increase the number of SSBs by 3 and transmit a secondary SSB set composed of 8 SSBs to the smart repeater 1420. Here, SSB1 to SSB 5 may be transmitted in the first to fifth beams, respectively, and then three SSBs of SSB 6 to SSB 8 may be transmitted in the optimal base station beam. That is, the base station 1410 may transmit the first 5 SSBs through beams in different directions. In addition, the base station 1410 may transmit SSB3 and the remaining three SSBs, although they have different indices, through the beam fixed in the direction of the smart repeater 1420. Meanwhile, the smart repeater 1420 may transmit SSB1 to SSB5 and the remaining three SSBs of SSB6 and SSB8 through the first to fourth smart repeater beams. That is, the smart repeater may transmit SSB1 to SSB 5 to the terminal through the first beam and SSB6 to SSB8 sequentially to the terminal through three beams in different directions.

With reference back to FIG. 9, the processes of S903 and S904 may be referred to as an SSB relay process. Here, the base station may inform the smart repeater and the terminal in advance that the beams with the first N initial SSBs are transmitted to the smart repeater and the beams with the latter M SSBs are transmitted to the terminal via the smart repeater. To this end, the base station may include information about N and M in a MIB or SIB broadcast toward the smart repeater and the terminal. Meanwhile, even if it is close to the smart repeater and far from the base station, if the terminal can connect to the base station directly, direct connection to the base station may be advantageous in various aspects such as transmission delay and entire network complexity. That is, the terminal may access the smart repeater when it is difficult to directly connect to the base station.

Meanwhile, a terminal located in a smart repeater coverage may obtain an index of an SSB received with the highest received signal strength among a sub-secondary SSB set composed of M SSBs. The terminal may transmit feedback with the index of the SSB received with the highest received signal strength to the smart repeater at step S905. Then, the smart repeater may receive the index of the SSB having the highest received signal strength at the smart repeater. And the smart repeater may forward the index of the SSB received from the terminal to the base station at step S906.

Figure 15:
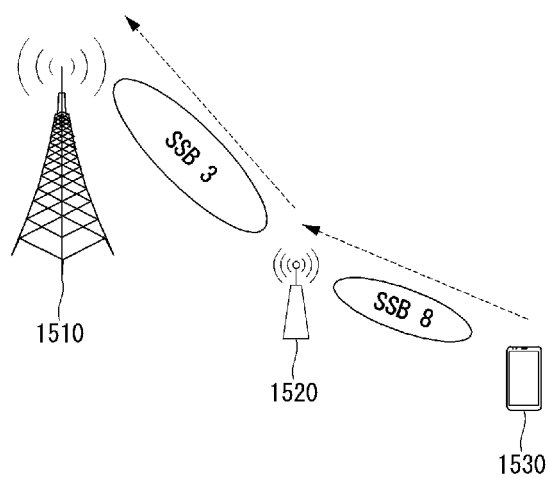
FIG. 15 is a conceptual diagram illustrating the first embodiment of the feedback relay process in FIG. 9.

FIG. 15 is a conceptual diagram illustrating the first embodiment of the feedback relay process in FIG. 9.

With reference to FIG. 15, in the feedback relay process, terminal 1530 may obtain index 8 of the SSB received with the highest received signal strength among the sub-secondary SSB set composed of four SSBs. In addition, the terminal 1530 may transmit feedback with index 8 of the SSB received with the highest received signal strength to the smart repeater 1520. Then, the smart repeater 1520 may receive from the terminal 1530 index 8 of the SSB received with the highest received signal strength at the terminal 1530. The smart repeater 1520 may also forward the SSB index 8 received from the terminal 1530 to the base station 1510. Then, the base station 1510 may receive the SSB index 8 from the smart repeater 1520.

With reference back to FIG. 9, the base station may identify, at step S907, the best beam direction of the base station toward the terminal and the best beam direction of the smart repeater toward the terminal based on the SSB index obtained by transmitting the primary SSB set and the SSB index obtained by transmitting the secondary SSB set.

Meanwhile, the beam search method disclosed in FIG. 9 may be a transmit beam search process of a base station and a smart repeater using SSB. However, the beam search method disclosed in FIG. 9 may also be applied to a receive beam search process. That is, assuming that the number of receive beams of the smart repeater is N equal to the number of transmit beams, the base station may sequentially transmit the primary SSB set N times. Then, the receive beam of the smart repeater may be fixed within one SSB set, but may be changed in units of intervals of the SSB set. In the case where the number of receive beams of the terminal is N, the secondary SSB set may be sequentially transmitted N times.

Figure 16:
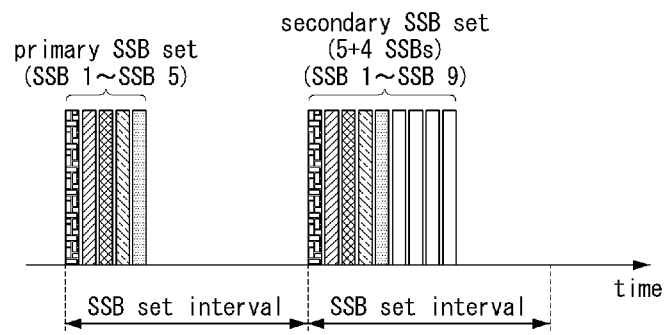
FIG. 16 is a conceptual diagram illustrating the first embodiment of SSB sets transmitted by the base station in FIG. 9.

FIG. 16 is a conceptual diagram illustrating the first embodiment of SSB sets transmitted by the base station in FIG. 9.

With reference to FIG. 16, SSB 1 to SSB 5 may constitute a primary SSB set. The primary SSB set may be transmitted from the base station to the smart repeater at the primary SSB transmission time. Next, SSB 1 to SSB 9 may constitute a secondary SSB set. The secondary SSB set may be transmitted from the base station to the smart repeater at the secondary SSB transmission time. The SSB set transmission interval may be set to one of 5 ms, 10 ms, 20 ms, 40 ms, 80 ms, or 160 ms.

Meanwhile, one base station may support a plurality of smart repeaters. In this case, the plurality of smart repeaters may each transmit feedback with the best beam direction (SSB index) to the base station. Then, the base station may increase the number of SSBs according to the number of smart repeaters in the process of transmitting the secondary SSB set. That is, assuming that there may be K smart repeaters and the number of supportable beams of the ith smart repeater is M(i), the number of SSBs transmitted by the base station in the secondary SSB set B may be equal to Equation 1. Here, K, M(i), and B may each be a positive integer. For example, M(i) may be M×i.

$$B = N + \sum_{i=1}^{K} M(i) \qquad \text{[Equation 1]}$$

Meanwhile, the base station may not be able to transmit many SSBs in one restricted SSB set of 5 ms. In this case, the base station may transmit the secondary SSB set in several SSB set transmission occasions in a distributed manner. FIG. 16 may be a configuration of an SSB set when N=5, M=4, and K=1.

Figure 17:
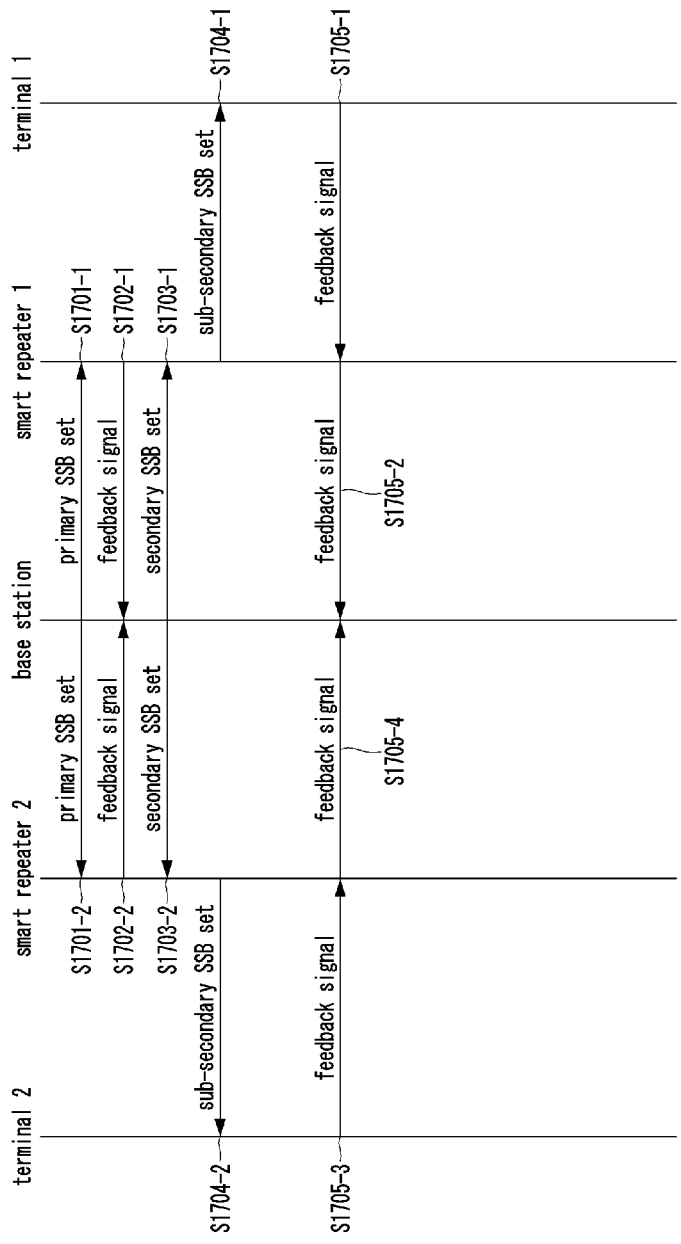
FIG. 17 is a signal flow diagram illustrating the second embodiment of a beam search method in a smart repeater system.

FIG. 17 is a signal flow diagram illustrating the second embodiment of a beam search method in a smart repeater system.

In the beam search method of FIG. 17, the base station may sequentially transmit, at steps S1701-1 and S1701-2, a primary SSB set composed of SSB 1 to SSB N signals to smart repeater 1 and smart repeater 2 in N beam directions using N beams during a primary SSB set transmission period. Here, N may be a positive integer. Accordingly, smart repeater 1 and smart repeater 2 can receive N beams including SSB 1 to SSB N from the base station and measure the received signal strength of each beam.

Here, the smart repeater 1 may receive N beams including SSB 1 to SSB N from the base station, measure the received signal strength of each beam, acquire the index of the SSB in the beam having the highest received signal strength, and transmit feedback with the index to the base station at step S1702-1). Then, the base station may receive the SSB index having the highest received signal strength at smart repeater 1. Accordingly, the base station may recognize the beam carrying the corresponding SSB index as the best beam for smart repeater 1. As such, the smart repeater 1 may repeatedly perform a process of searching for the best beam at regular intervals.

Meanwhile, the smart repeater 2 may receive N beams including SSB 1 to SSB N from the base station, measure the received signal strength of each beam, acquire the index of the SSB in the beam having the highest received signal strength, and transmit feedback with the index to the base station at step S1702-2. Then, the base station may receive the SSB index having the highest received signal strength at smart repeater 2. Accordingly, the base station may recognize the beam with the corresponding SSB index as the best beam for smart repeater 2. As such, the smart repeater 2 may repeatedly perform a process of searching for the best beam at regular intervals.

Meanwhile, after finding the best beam for each of smart repeater 1 and smart repeater 2, the base station may increase the number of SSBs by 2M during the transmission period of the secondary SSB set and transmit the secondary SSB set composed of N+2M SSBs to repeater 1 and repeater 2 at steps S1703-1 and 1703-2. Here, M may be a positive integer. In this case, the base station may sequentially transmit N SSBs toward smart repeater 1 and smart repeater 2 using N beams. The base station may also transmit all the remaining M SSBs for smart repeater 1 toward smart repeater 1 through the best beam for smart repeater 1. In addition, the base station may transmit all the remaining M SSBs for smart repeater 2 toward the smart repeater 2 through the best beam for smart repeater 2. That is, the base station may transmit the first N SSBs to smart repeater 1 and smart repeater 2 using beams in different directions, transmit the remaining M SSBs to smart repeater 1 using the best beam for smart repeater 1, and transmit other remaining M SSBs to smart repeater 2 using the best beam for smart repeater 2. Then, after receiving N+M SSBs, smart repeater 1 may transmit a sub-secondary SSB set composed of M SSBs toward terminal 1 through M beams in different directions at step S1704-1. Likewise, after receiving N+M SSBs, smart repeater 2 may transmit a sub-secondary SSB set composed of M SSBs toward terminal 2 through M beams in different directions at step S1704-2.

Meanwhile, terminal 1 located in the coverage of smart repeater 1 may acquire the index of the SSB received with the highest received signal strength among the sub-secondary SSB set consisting of M SSBs. The terminal 1 may also transmit feedback with the index of the SSB received with the highest received signal strength to smart repeater 1 at step S1705-1. Then, the smart repeater 1 may receive from terminal 1 the index of the SSB received with the highest received signal strength at terminal 1. And smart repeater 1 may forward the index of the SSB received from terminal 1 to the base station at step S1705-2. Likewise, terminal 2 located in the coverage of smart repeater 2 may acquire the index of the SSB received with the highest received signal strength among the sub secondary SSB set composed of M SSBs. Terminal 2 may also transmit feedback with the index of the SSB received with the highest received signal strength to smart repeater 2 (S1705-3). Then, smart repeater 2 may receive from terminal 2 the index of the SSB received with the highest received signal strength at the terminal 1530. And smart repeater 2 may forward the index of the SSB received from the terminal to the base station at step S1705-4.

Accordingly, the base station may identify the best beam direction of the base station beam toward terminal 1 and the best beam direction of smart repeater 1 toward 1 terminal based on the SSB index obtained by transmitting the primary SSB set and the SSB index obtained by transmitting the secondary SSB set. The base station may also identify the best beam direction of the base station beam toward terminal 2 and the best beam direction of smart repeater 2 toward the terminal based on the SSB index obtained by transmitting the primary SSB set and the SSB index obtained by transmitting the secondary SSB set.

Figure 18:
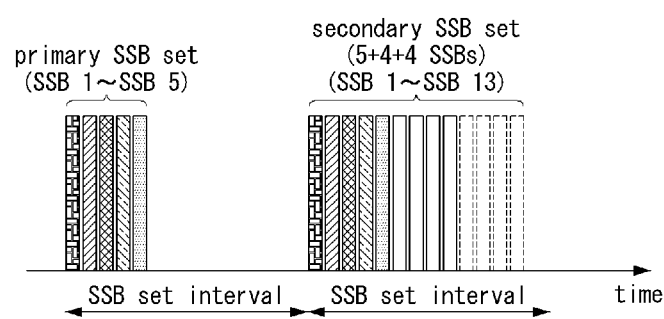
FIG. 18 is a conceptual diagram illustrating the first embodiment of SSB sets transmitted by the base station in FIG. 17.

FIG. 18 is a conceptual diagram illustrating the first embodiment of SSB sets transmitted by the base station in FIG. 17.

With reference to FIG. 18, SSB1 to SSB4 may constitute a primary SSB set. The primary SSB set may be transmitted from the base station to smart repeater 1 and smart repeater 2 at the primary SSB transmission time. Next, SSB1 to SSB13 may constitute a secondary SSB set. SSB1 to SSB9 constituting the secondary SSB may be transmitted from the base station to smart repeater 1 at the secondary SSB transmission time. SSB1 to SSB5 and SSB10 to SSB13 constituting the secondary SSB set may be transmitted from the base station to smart repeater 2 at the secondary SSB transmission time. The SSB set transmission interval may be set to one of 5 ms, 10 ms, 20 ms, 40 ms, 80 ms, or 160 ms.

Figure 19:
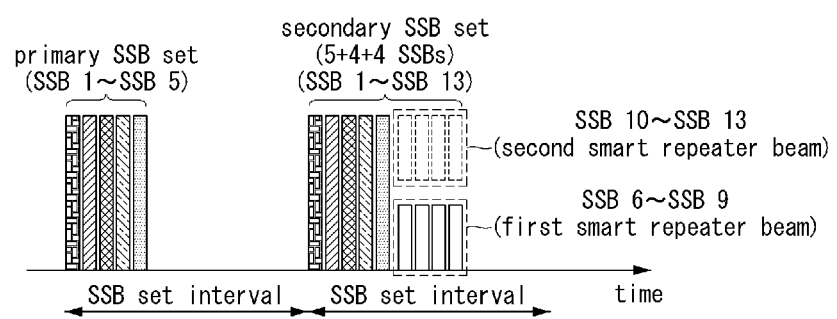
FIG. 19 is a conceptual diagram illustrating the second embodiment of SSB sets transmitted by the base station in FIG. 17.

FIG. 19 is a conceptual diagram illustrating the second embodiment of SSB sets transmitted by the base station in FIG. 17.

With reference to FIG. 19, SSB1 to SSB5 may constitute a primary SSB set. The primary SSB set may be transmitted from the base station to smart repeater 1 and smart repeater 2 at the primary SSB transmission time. Next, SSB1 to SSB13 may constitute a secondary SSB set. SSB6 to SSB9 and SSB10 to SSB13 of the secondary SSB set may be spatially separated from each other and temporally identical to each other. SSB1 to SSB9 constituting the secondary SSB may be transmitted from the base station to smart repeater 1 at the secondary SSB transmission time. SSB1 to SSB5 and SSB 10 to SSB13 of the secondary SSB set may be transmitted from the base station to smart repeater 2 at the secondary SSB transmission time. The SSB set transmission interval may be set to one of 5 ms, 10 ms, 20 ms, 40 ms, 80 ms, or 160 ms. Here, the location of smart repeater 1 and the location of smart limiter 2 may be far apart. Also, the beams of smart repeater 1 and the beams of smart repeater 2 may not interfere with each other. In this case, SSBs for smart repeater 1 and smart repeater 2 may be spatially separated and transmitted simultaneously. When the two smart repeaters of smart repeater 1 and smart repeater 2 transmit the secondary SSB set, SSB6 to SSB9 and SSB10 to SSB13 may be spatially multiplexed. In this case, SSB6 to SSB 9 and SSB 10 to SSB 13 may be simultaneously transmitted. Here, SSB6 to SSB9 and SSB10 to SSB13 that are spatially multiplexed to be transmitted simultaneously may have different SSB indices. Since they are spatially multiplexed, even if SSB 10 to SSB 13 are changed to SSB 6 to SSB 9, it is possible to identify which smart repeater terminal 1 or terminal 2 attempts access through information exchange between smart repeater 1 and smart repeater 2 and the base station.

Figure 20:
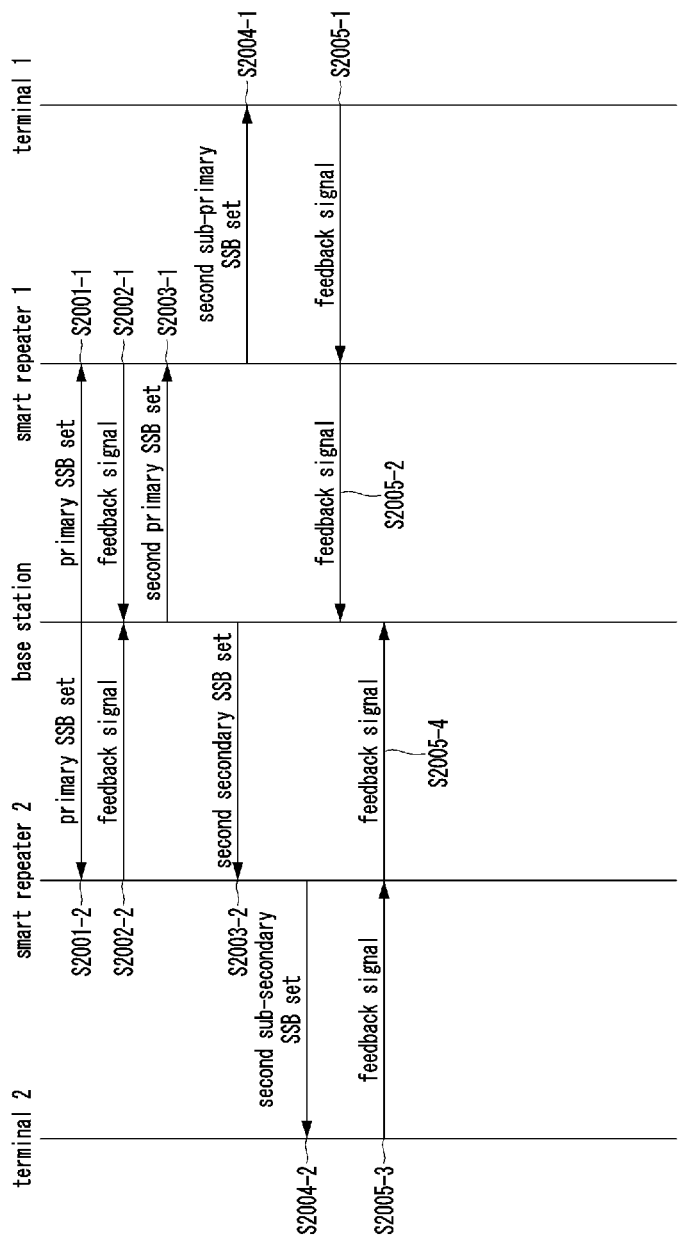
FIG. 20 is a signal flow diagram illustrating the third embodiment of a beam search method in a smart repeater system.

FIG. 20 is a signal flow diagram illustrating the third embodiment of a beam search method in a smart repeater system.

In the beam search method of FIG. 20, the base station may sequentially transmit, at steps S2001-1 and S2001-2, a primary SSB set composed of SSB 1 to SSB N signals to smart repeater 1 and smart repeater 2 in N beam directions using N beams during a primary SSB set transmission period. Here, N may be a positive integer. Accordingly, smart repeater 1 and smart repeater 2 can receive N beams including SSB 1 to SSB N from the base station and measure the received signal strength of each beam.

Here, smart repeater 1 may receive N beams including SSB 1 to SSB N from the base station, measure the received signal strength of each beam, acquire the index of the SSB in the beam having the highest received signal strength, and transmit feedback with the index to the base station at step S2002-1). Then, the base station may receive the SSB index having the highest received signal strength at smart repeater 1. Accordingly, the base station may recognize the beam carrying the corresponding SSB index as the best beam for smart repeater 1. As such, smart repeater 1 may repeatedly perform a process of searching for the best beam at regular intervals.

Meanwhile, smart repeater 2 may receive N beams including SSB 1 to SSB N from the base station, measure the received signal strength of each beam, acquire the index of the SSB in the beam having the highest received signal strength, and transmit feedback with the index to the base station at step S2002-2. Then, the base station may receive the SSB index having the highest received signal strength at smart repeater 2. Accordingly, the base station may recognize the beam with the corresponding SSB index as the best beam for smart repeater 2. As such, smart repeater 2 may repeatedly perform a process of searching for the best beam at regular intervals.

After finding the best beam in the direction of smart repeater 1, the base station may increase the number of SSBs by M during the transmission period of the first secondary SSB set and transmit the first secondary SSB set composed of N+M SSBs to smart repeater 1 at step S2003-1. Here, M may be a positive integer. In this case, the base station may sequentially transmit N SSBs toward the smart repeater using N beams. The base station may transmit all the remaining M SSBs toward smart repeater 1 through the best beam for smart repeater 1.

Likewise, after finding the best beam in the direction of smart repeater 2, the base station may increase the number of SSBs by M during the transmission period of the second secondary SSB set and transmit the second secondary SSB set composed of N+M SSBs to smart repeater 2 at step S2003-2. In this case, the base station may transmit N SSBs sequentially toward the smart repeater 2 using N beams. In addition, the base station may transmit all the remaining M SSBs toward smart repeater 2 through the best beam for smart repeater 2.

Then, after receiving N+M SSBs, smart repeater 1 may transmit a first sub-secondary SSB set composed of M SSBs toward terminal 1 through M beams in different directions at step S2004-1. Likewise, after receiving N+M SSBs, smart repeater 2 may transmit a second sub-secondary SSB set composed of M SSBs toward terminal 2 through M beams in different directions at step S2004-2.

Meanwhile, terminal 1 located within the coverage of smart repeater 1 may acquire the index of the SSB received with the highest received signal strength among the first sub-secondary SSB set composed of M SSBs. Terminal 1 may also transmit feedback with the index of the SSB received with the highest received signal strength to smart repeater 1 at step S2005-1. Then, the smart repeater 1 may receive from terminal 1 the index of the SSB received with the highest received signal strength at terminal 1. And smart repeater 1 may transmit feedback with the index of the SSB received from terminal 1 to the base station at step S2005-2. Likewise, terminal 2 located within the coverage of smart repeater 2 may acquire the index of the SSB received with the highest received signal strength among the second sub-secondary SSB set composed of M SSBs. Terminal 2 may also transmit feedback with the index of the SSB received with the highest received signal strength to smart repeater 2 at step S2005-3. Then, smart repeater 2 may receive from terminal 2 the index of the SSB received with the highest received signal strength at the terminal 1530. And smart repeater 2 may forward the index of the SSB received from the terminal to the base station at step S2005-4.

Accordingly, the base station may identify the best beam direction of the base station toward terminal 1 and the best beam direction of smart repeater 1 toward terminal 1 based on the SSB index obtained by transmitting the primary SSB set and the SSB index obtained by transmitting the first secondary SSB set. The base station may also identify the best beam direction of the base station beam toward terminal 2 and the best beam direction of smart repeater 2 toward the terminal based on the SSB index obtained by transmitting the primary SSB set and the SSB index obtained by transmitting the second-secondary SSB set.

Figure 21:
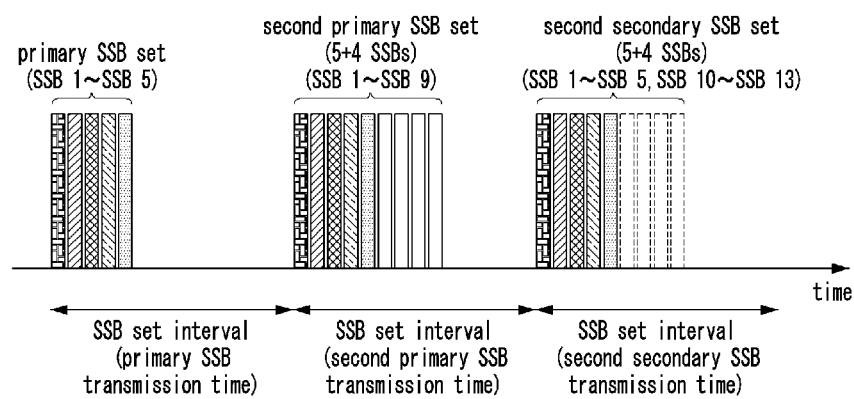
FIG. 21 is a conceptual diagram illustrating the first embodiment of SSB sets transmitted by the base station in FIG. 20.

FIG. 21 is a conceptual diagram illustrating the first embodiment of SSB sets transmitted by the base station in FIG. 20.

With reference to FIG. 21, SSB 1 to SSB 5 may constitute a primary SSB set. The primary SSB set may be transmitted from the base station to smart repeater 1 and smart repeater 2 at the primary SSB transmission time. Next, SSB 1 to SSB 9 may constitute the first secondary SSB set. The first secondary SSB set may be transmitted from the base station to smart repeater and smart repeater 1 at the first secondary SSB transmission time. Also, SSB 1 to SSB 5 and SSB 10 to SSB 13 may constitute the second secondary SSB set. The second secondary SSB set may be transmitted from the base station to smart repeater 2 at the secondary SSB transmission time.

Figure 22:
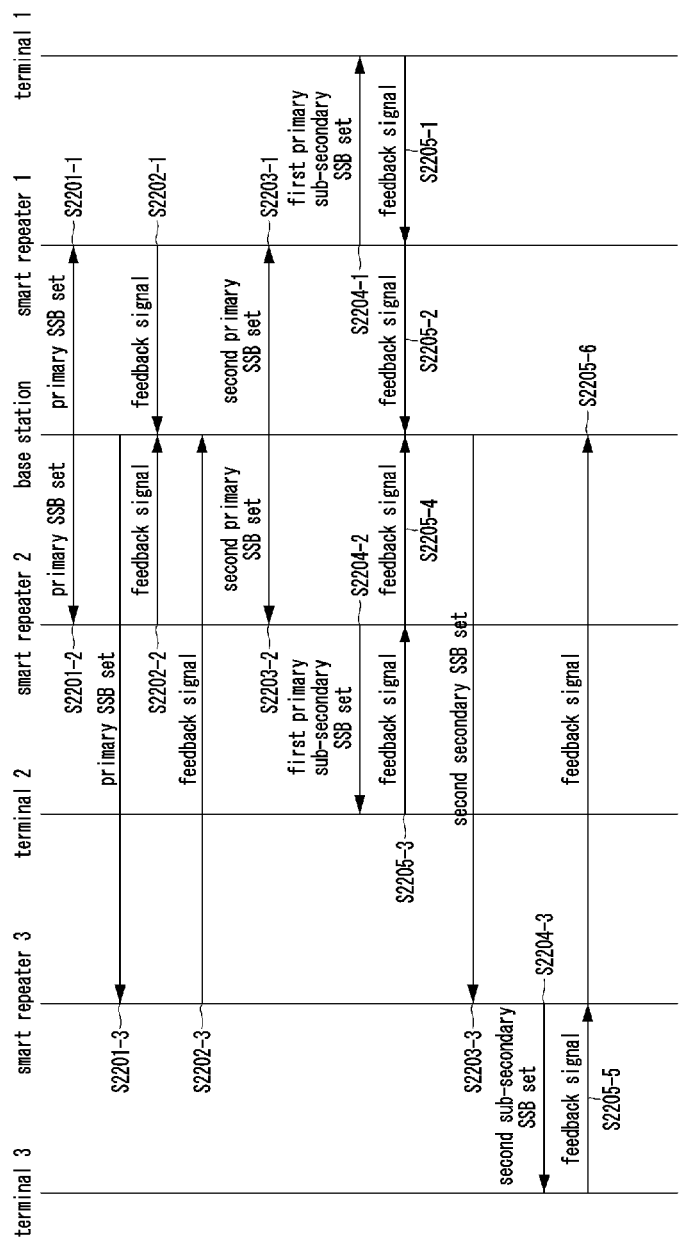
FIG. 22 is a signal flow diagram illustrating the third embodiment of the beam search method in a smart repeater system.

FIG. 22 is a signal flow diagram illustrating the third embodiment of the beam search method in a smart repeater system.

In the beam search method of FIG. 22, the base station may sequentially transmit, at steps S2201-1 to S2201-3, a primary SSB set composed of SSB 1 to SSB N signals to smart repeater 1 to smart repeater 3 in N beam directions using N beams during a primary SSB set transmission period. Here, N may be a positive integer. Accordingly, smart repeater 1 to smart repeater 3 may receive N beams including SSB 1 to SSB N from the base station and measure the received signal strength of each beam.

Here, smart repeater 1 may receive N beams including SSB 1 to SSB N from the base station, measure the received signal strength of each beam, acquire the index of the SSB in the beam having the highest received signal strength, and transmit feedback with the index to the base station at step S2202-1 Then, the base station may receive the SSB index having the highest received signal strength at smart repeater 1. Accordingly, the base station may recognize the beam with the corresponding SSB index as the best beam for smart repeater 1. As such, the smart repeater 1 may repeatedly perform a process of searching for the best beam at regular intervals.

Meanwhile, smart repeater 2 may receive N beams including SSB 1 to SSB N from the base station, measure the received signal strength of each beam, acquire the index of the SSB in the beam having the highest received signal strength, and transmit feedback with the index to the base station at step S2202-2. Then, the base station may receive the SSB index having the highest received signal strength at smart repeater 2. Accordingly, the base station may recognize the beam with the corresponding SSB index as the best beam for smart repeater 2. As such, the smart repeater 2 may repeatedly perform a process of searching for the best beam at regular intervals.

Here, smart repeater 3 may receive N beams including SSB 1 to SSB N from the base station, measure the received signal strength of each beam, acquire the index of the SSB in the beam having the highest received signal strength, and transmit feedback with the index to the base station at step S2202-3. Then, the base station may receive the SSB index having the highest received signal strength at smart repeater 3. Accordingly, the base station may recognize the beam with the corresponding SSB index as the best beam for smart repeater 3. As such, the smart repeater 3 may repeatedly perform a process of searching for the best beam at regular intervals.

Next, after finding the best beam for each of smart repeater 1 and smart repeater 2, the base station may increase the number of SSBs by 2M during the transmission period of the first secondary SSB set and transmit the first secondary SSB set composed of N+2M SSBs to repeater 1 and repeater 2 at steps S2203-1 and 2203-2. Here, M may be a positive integer. In this case, the base station may sequentially transmit N SSBs toward smart repeater 1 and smart repeater 2 using N beams. The base station may also transmit all the remaining M SSBs for smart repeater 1 toward smart repeater 1 through the best beam for smart repeater 1. In addition, the base station may transmit all the remaining M SSBs for smart repeater 2 toward the smart repeater 2 through the best beam for smart repeater 2 that is spatially separated from the best beam of smart repeater 1. That is, the base station may transmit the first N SSBs to smart repeater 1 and smart repeater 2 using beams in different directions, transmit the remaining M SSBs for smart repeater 1 to smart repeater 1 using the best beam for smart repeater 1, and transmit other remaining M SSBs for smart repeater 2 to smart repeater 2 using the best beam for smart repeater 2 that is spatially separated from the best beam of smart repeater 1. Then, after receiving N+M SSBs, smart repeater 1 may transmit a first primary sub-secondary SSB set composed of M SSBs toward terminal 1 through M beams in different directions at step S2204-1. Likewise, after receiving N+M SSBs, smart repeater 2 may transmit a first primary sub-secondary SSB set composed of M SSBs toward terminal 2 through M beams in different directions at step S2204-2.

Meanwhile, terminal 1 located within the coverage of smart repeater 1 may acquire the index of the SSB received with the highest received signal strength among the first primary sub-secondary SSB set consisting of M SSBs. Terminal 1 may also transmit feedback with the index of the SSB received with the highest received signal strength to smart repeater 1 at step S2205-1. Then, the smart repeater 1 may receive from terminal 1 the index of the SSB received with the highest received signal strength at terminal 1. And smart repeater 1 may forward the index of the SSB received from terminal 1 to the base station at step S2205-2. Likewise, terminal 2 located in the coverage of smart repeater 2 may acquire the index of the SSB received with the highest received signal strength among the sub secondary SSB set composed of M SSBs. Terminal 2 may also transmit feedback with the index of the SSB received with the highest received signal strength to smart repeater 2 at step S2205-3. Then, smart repeater 2 may receive from terminal 2 the index of the SSB received with the highest received signal strength at the terminal 1530. And smart repeater 2 may forward the index of the SSB received from the terminal to the base station at step S2205-4.

Meanwhile, after finding the best beam for smart repeater 3, the base station may increase the number of SSBs by 2M during the transmission period of the second secondary SSB set and transmit the second secondary SSB set composed of N+2M SSBs to repeater 3 at step S2203-3. In this case, the base station may sequentially transmit N SSBs toward smart repeater 3 using N beams. The base station may transmit all the remaining M SSBs toward smart repeater 3 through the best beam for smart repeater 3. That is, the base station may transmit the first N SSBs to smart repeater 3 using beams in different directions and the remaining M SSBs to smart repeater 3 using the best beam for smart repeater 3. Then, after receiving N+M SSBs, smart repeater 3 may transmit a second sub-secondary SSB set composed of M SSBs toward terminal 3 through M beams in different directions at step S2204-3.

Meanwhile, terminal 3 located within the coverage of smart repeater 3 may acquire the index of the SSB received with the highest received signal strength among the second sub-secondary SSB set consisting of M SSBs. Terminal 3 may also transmit feedback with the index of the SSB received with the highest received signal strength to smart repeater 3 at step S2205-5. Then, smart repeater 3 may receive from terminal 3 the index of the SSB received with the highest received signal strength at terminal 1. And smart repeater 3 may forward the index of the SSB received from terminal 3 to the base station at step S2205-6.

Accordingly, the base station may identify the best beam direction of the base station toward terminal 1 and the best beam direction of smart repeater 1 toward terminal 1 based on the SSB index obtained by transmitting the primary SSB set and the SSB index obtained by transmitting the first secondary SSB set. The base station may also identify the best beam direction of the base station toward terminal 2 and the best beam direction of smart repeater 2 toward the terminal 2 based on the SSB index obtained by transmitting the primary SSB set and the SSB index obtained by transmitting the first secondary SSB set. The base station may also identify the best beam direction of the base station beam toward terminal 3 and the best beam direction of smart repeater 3 toward terminal 3 based on the SSB index obtained by transmitting the primary SSB set and the SSB index obtained by transmitting the second secondary SSB set.

Figure 23:
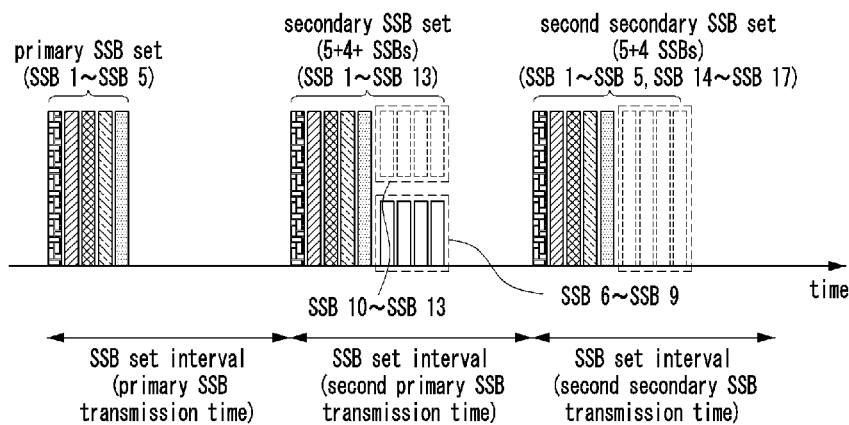
FIG. 23 is a conceptual diagram illustrating the first embodiment of SSB sets transmitted by the base station in FIG. 22.

FIG. 23 is a conceptual diagram illustrating the first embodiment of SSB sets transmitted by the base station in FIG. 22.

With reference to FIG. 23, SSB 1 to SSB 5 may constitute a primary SSB set. The primary SSB set may be transmitted from the base station to smart repeater 1 to smart repeater 3 at the primary SSB transmission time. Next, SSB 1 to SSB 13 may constitute a secondary SSB set. SSB6 to SSB9 and SSB10 to SSB13 of the secondary SSB set may be spatially separated from each other and temporally identical to each other. SSB1 to SSB9 of the secondary SSB may be transmitted from the base station to smart repeater 1 at the first secondary SSB transmission time. SSB1 to SSB5 and SSB10 to SSB13 of the secondary SSB set may be transmitted from the base station to smart repeater 2 at the first secondary SSB transmission time. Next, SSB 1 to SSB 5 and SSB 14 to SSB 17 may constitute the second secondary SSB set. SSB1 to SSB5 and SSB 14 to SSB13 of the secondary SSB set may be transmitted from the base station to smart repeater 3 at the second secondary SSB transmission time. The SSB set transmission interval may be set to one of 5 ms, 10 ms, 20 ms, 40 ms, 80 ms, or 160 ms.

In the case of using spatial multiplexing as above, the base station may simultaneously transmit a plurality of SSBs with different beams. As a result, the transmit power of spatially multiplexed SSBs may be lowered compared to the case where spatial multiplexing is not used, remaining below the transmission power limit of the base station. For example, the spatial multiplexing index may be equal to the number L of smart repeaters transmitting simultaneously when the base station equally distributes the transmit power to the number of simultaneously transmit beams in FIG. 19. The base station may also be possible to non-uniformly distribute power to the simultaneous transmit beams. When transmitting spatially multiplexed SSBs to solve the problem caused by the difference in SSB transmit power as above, the smart repeaters may relay the SSBs by amplifying the power as much attenuated as in transmission. In this way, the received signal powers of the SSBs at the terminal, i.e., the SSBs corresponding to the base station beams and the SSBs corresponding to the smart repeater beams, can be fairly compared. However, in the case where it is impossible to amplify the spatially multiplexed SSBs due to the transmit power limit of the smart repeater, spatial multiplexing information for each SSB group may be transmitted in the SIB or the like. For example, in the case of FIG. 19, SSB 1 to SSB 5 may have no spatial multiplexing, and SSB 6 to SSB 9 and SSB 10 to SSB 13 may have a spatial multiplexing index of 2. The base station may transmit such information explicitly or implicitly to the smart repeaters or terminals using SIB or the like. The terminal may determine whether to select a beam via the smart repeater by comparing the received signal strength of the SSBs received from the smart repeater, which are compensated based on the spatial multiplexing information, with the received signal strength of the SSBs directly received from the base station.

It may be possible for some, among a plurality of smart repeaters, do not adopt spatial multiplexing and others adopt spatial multiplexing as in the case of FIG. 23. In this case, SSB 1 to SSB 5 may not be spatially multiplexed, SSB 6 to SSB 9 and SSB 10 to SSB 13 may be spatially multiplexed with a spatial multiplexing index of 2, and SSB 14 to SSB 17 may not be spatially multiplexed.

Figure 24:
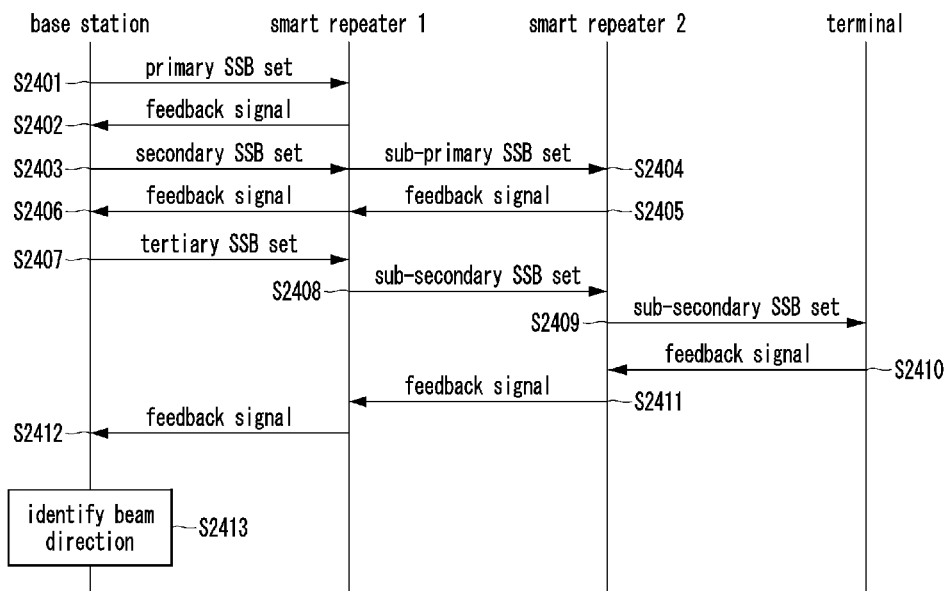
FIG. 24 is a signal flow diagram illustrating the fourth embodiment of a beam search method in a smart repeater system.

FIG. 24 is a signal flow diagram illustrating the fourth embodiment of a beam search method in a smart repeater system.

With reference to FIG. 24, in the beam search method, a base station may sequentially transmit, at step S2401, a primary SSB set composed of SSB 1 to SSB N signals in N beam directions using N beams during a primary SSB set transmission period. Here, N may be a positive integer. Accordingly, smart repeater may receive N beams including SSB 1 to SSB N from the base station and measure the received signal strength of each beam.

Figure 25:
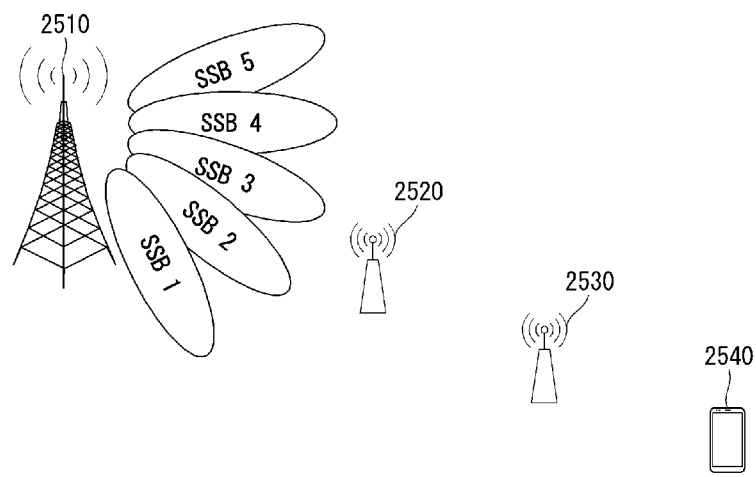
FIG. 25 is a conceptual diagram illustrating the first embodiment of a primary SSB set transmission process in FIG. 24.

FIG. 25 is a conceptual diagram illustrating the first embodiment of a primary SSB set transmission process in FIG. 24.

With reference to FIG. 25, the base station 2510 may sequentially transmit a primary SSB set composed of SSB 1 to SSB 5 signals in 5 beam directions using 5 beams during a primary SSB set transmission period. Accordingly, smart repeater 1 2520 may receive 5 beams including SSB 1 to SSB 5 from the base station 2510 and measure the received signal strength of each beam. Here, smart repeater 1 2520 may obtain index 3 of the SSB in the third beam having the highest received signal strength.

With reference back to FIG. 24, smart repeater 1 may receive N beams of SSB 1 to SSB N from the base station, measure the received signal strength of each beam, acquire the SSB index in the beam having the highest received signal strength, and transmit a primary feedback with the SSB index to the base station at step S2402. Then, the base station may receive the SSB index having the highest received signal strength at smart repeater 1. Accordingly, the base station may recognize the beam carrying the corresponding SSB index as the best beam (i.e., the best base station beam). As such, smart repeater 1 may repeatedly perform a procedure of searching for the best beam at regular intervals.

Figure 26:
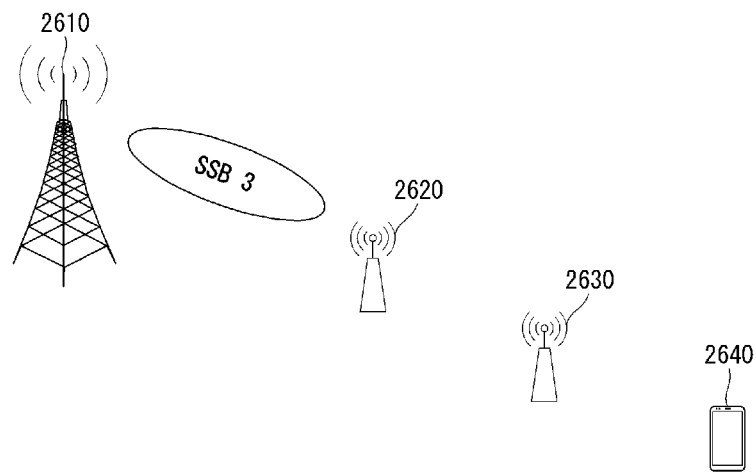
FIG. 26 is a conceptual diagram illustrating the first embodiment of the primary feedback signal transmission process in FIG. 24.

FIG. 26 is a conceptual diagram illustrating the first embodiment of the primary feedback signal transmission process in FIG. 24.

In the primary feedback signal transmission process of FIG. 26, smart repeater 1 2620 may receive 5 beams including SSB 1 to SSB 5 from the base station 2610, measure the received signal strength of each beam, acquire the SSB index of 3 in the beam having the highest received signal strength, and transmit a primary feedback with the index to the base station 2610. Then, the base station 2610 may receive the SSB index having the highest received signal strength from smart repeater 1 2620. Accordingly, the base station 2610 may recognize the beam with the corresponding SSB index as the best beam (i.e., the best base station beam). As such, the smart repeater 2620 may repeatedly perform a process of searching for the best beam at regular intervals.

With reference back to FIG. 24, after finding the best beam in the direction of the smart repeater, the base station may increase the number of SSBs by M, by way of example, during the transmission period of the secondary SSB set and transmit the secondary SSB set composed of N+M SSBs to the smart repeater at step S2403. Here, M may be a positive integer. In this case, the base station may sequentially transmit N SSBs toward smart repeater 1 using N beams. The base station may also transmit all the remaining M SSBs toward smart repeater 1 through the best beam. That is, the base station may transmit the first N SSBs using beams in different directions and the remaining M SSBs using the best beam. Then, after receiving N+M SSBs, smart repeater 1 may transmit a sub-primary SSB set composed of M SSBs toward smart repeater 2 through M beams in different directions at step S2404. The processes of S2403 and S2404 may be referred to as an SSB relay process.

Here, the base station may inform smart repeater 1 and smart repeater 2 in advance that the beams with the first N initial SSBs are transmitted to smart repeater 1 and the beams with the latter M SSBs are transmitted to smart repeater 2 via smart repeater 1. To this end, the base station may include information of N and M in a master information block (MIB) or system information block (SIB) broadcast toward the smart repeater 1 and smart repeater 2.

Figure 27:
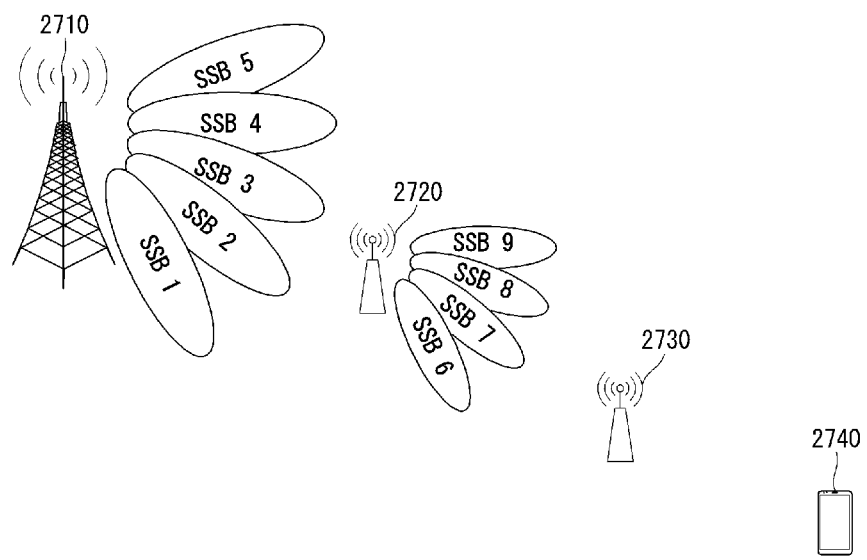
FIG. 27 is a conceptual diagram illustrating the first embodiment of the secondary SSB set transmission process in FIG. 24.

FIG. 27 is a conceptual diagram illustrating the first embodiment of the secondary SSB set transmission process in FIG. 24.

With reference to FIG. 27, the base station 2710 may sequentially transmit the secondary SSB set composed of SSB 1 to SSB 9 using five beams during a primary SSB set transmission period. That is, the base station 2710 may transmit SSB 1 to SSB 5 using 5 beams. The base station 2710 may also transmit SSB 6 to SSB 9 to smart repeater 1 2720 using the best beam carrying SSB 3. Then, smart repeater 1 2720 may receive SSB 1 to SSB 9 from the base station 2710 through 5 beams. In this case, the smart repeater 1 2720 may receive SSB 6 to SSB 9 through the best beam. Afterward, smart repeater 1 2720 may transmit SSB 6 to SSB 9 received from the base station 2710 to smart repeater 2 2730 using four beams.

With reference back to FIG. 24, smart repeater 2 may receive N beams of SSB N+1 to SSB N+M from the base station, measure the received signal strength of each beam, acquire the SSB index in the beam having the highest received signal strength, and transmit secondary feedback with the index to smart repeater 1 at step S2405. Then, smart repeater 1 may receive the SSB index having the highest received signal strength at smart repeater 2. Accordingly, smart repeater 1 may recognize the beam carrying the corresponding SSB index as the best beam (i.e., the best smart repeater 1 beam). As such, smart repeater 1 may repeatedly perform a procedure of searching for the best beam at regular intervals. Then, smart repeater 1 may forward, at step S2406, the secondary feedback with the SSB index having the highest received signal strength, which is received from smart repeater 2, to the base station. Accordingly, the base station may recognize the beam carrying the corresponding SSB index as the best beam (i.e., the best smart repeater 1 beam).

Figure 28:
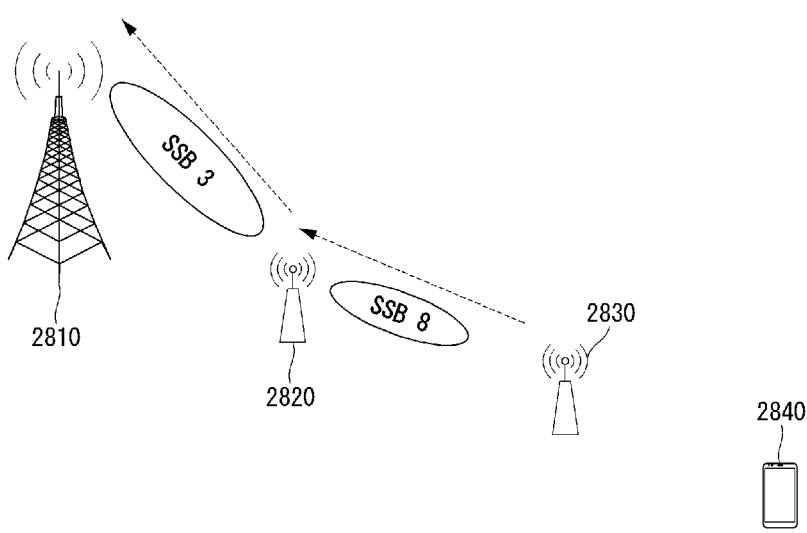
FIG. 28 is a conceptual diagram illustrating the first embodiment of the secondary feedback signal transmission process in FIG. 24.

FIG. 28 is a conceptual diagram illustrating the first embodiment of the secondary feedback signal transmission process in FIG. 24.

In the secondary feedback signal transmission process of FIG. 28, smart repeater 2 2830 may receive 4 beams including SSB 6 to SSB 9 from smart repeater 1 2820, measure the received signal strength of each beam, acquire index 8 of the SSB in the beam having the highest received signal strength, and transmits a secondary feedback with the index to smart repeater 1 2820. Then, smart repeater 1 2820 may receive index 8 of the SSB received with the highest received signal strength at smart repeater 2 2830. Accordingly, smart repeater 1 2820 may recognize the beam carrying the corresponding SSB index as the best beam (i.e., the best smart repeater 1 beam). In addition, smart repeater 1 2820 may forward to the base station 2810 the secondary feedback with index 8 of the SSB having the largest received signal strength at smart repeater 2 2830 through SSB 3. Accordingly, the base station 2810 may recognize the beam carrying the corresponding SSB index as the best beam (i.e., the best base station beam).

With reference back to FIG. 24, after finding the best beam in the direction of smart repeater 2, the base station may increase the number of SSBs by R, by way of example, during the transmission period of the tertiary SSB set and transmit the tertiary SSB set composed of N+R SSBs to smart repeater 1 at step S2407. Here, R may be a positive integer. In this case, the base station may sequentially transmit N SSBs toward smart repeater 1 using N beams. The base station may also transmit all the remaining R SSBs toward smart repeater 1 through the best beam. That is, the base station may transmit the first N SSBs using beams in different directions and the remaining R SSBs using the best beam. Then, after receiving N+R SSBs, smart repeater 1 may transmit a sub-secondary SSB set composed of R SSBs toward smart repeater 2 through the best beam at step S2408. Accordingly, smart repeater 2 may receive sub-secondary SSB set composed of R SSBs from smart repeater 1 through the best beam. Afterward, smart repeater 2 may transmit, at step S2409, SSB N+1 to SSB N+R received from smart repeater 1 to the terminal using R beams.

Figure 29:
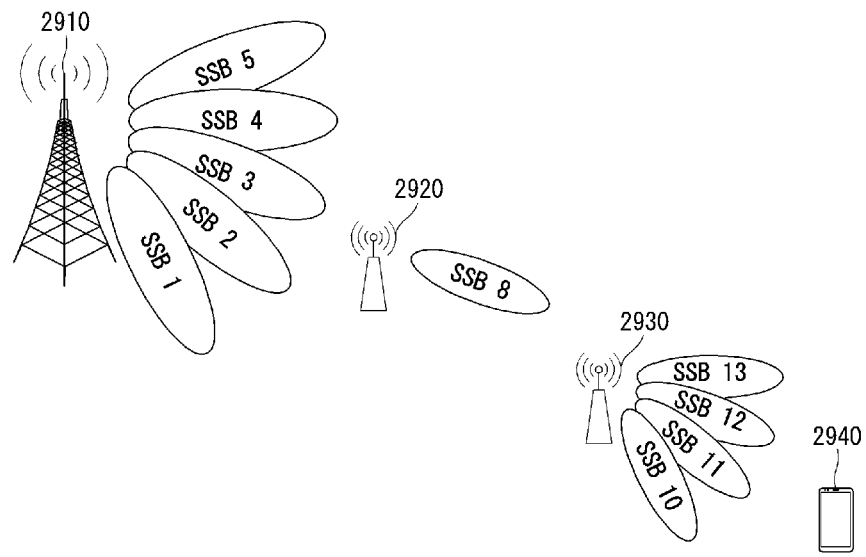
FIG. 29 is a conceptual diagram illustrating the first embodiment of the tertiary SSB set transmission process in FIG. 24.

FIG. 29 is a conceptual diagram illustrating the first embodiment of the tertiary SSB set transmission process in FIG. 24.

With reference to FIG. 29, after finding the best beam for smart repeater 2 2930, the base station may increase the number of SSBs by 4 during the transmission period of the tertiary SSB set and transmit the tertiary SSB set composed of 9 SSBs to smart repeater 1 2920. In this case, the base station 2910 may sequentially transmit 5 SSBs toward smart repeater 1 2920 using 5 beams. The base station 2910 may also transmit all the remaining 4 SSBs toward smart repeater 1 2920 through the best beam through which SSB 3 was transmitted. That is, the base station 2910 may transmit the first 5 SSBs using beams in different directions and the remaining 4 SSBs using the best beam. Then, after receiving 9 SSBs, smart repeater 1 2920 may transmit a sub-secondary SSB set composed of 4 SSBs toward smart repeater 2 2930 through the best beam through which SSB 8 was transmitted. Accordingly, smart repeater 2 2930 may receive SSB 10 to SSB 13 from smart repeater 1 2920 through the best beam. Afterward, smart repeater 2 2930 may transmit SSB 10 to SSB 13 received from smart repeater 1 2920 to the terminal 2940 using 4 beams.

With reference back to FIG. 24, the terminal may receive SSB N+1 to SSB N+R from smart repeater 2 through R beams, measure the received signal strength of each beam, acquire the SSB index in the beam having the highest received signal strength, and transmit tertiary feedback with the index to smart repeater 2 at step S2410. Then, smart repeater 2 may receive the SSB index having the highest received signal strength at the terminal.

Accordingly, the base station 2 may recognize the beam carrying the corresponding SSB index as the best beam 2, i.e., the smart repeater 2 beam. As such, smart repeater 2 may repeatedly perform a process of searching for the best beam at regular intervals. Then, smart repeater 2 may forward, at step S2411, the tertiary feedback with the SSB index having the highest received signal strength, which is received from the terminal, to smart repeater 1. Accordingly, smart repeater 1 may recognize the beam carrying the corresponding SSB index as the best beam (i.e., the best smart repeater 2 beam).

Then, smart repeater 1 may forward, at step S2412, the tertiary feedback with the SSB index having the highest received signal strength, which is received from smart repeater 2, to the base station. Accordingly, the base station may recognize the beam carrying the corresponding SSB index as the best beam (i.e., the best smart repeater 2 beam).

Figure 30:
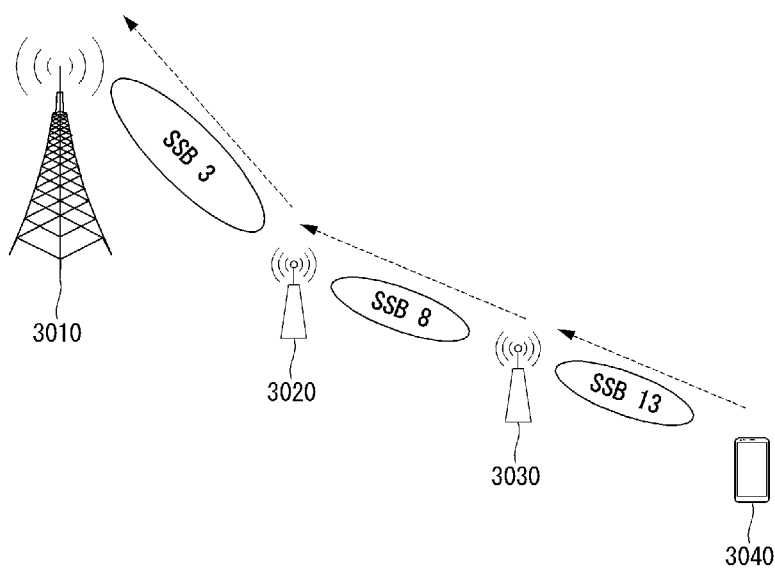
FIG. 30 is a conceptual diagram illustrating the first embodiment of the tertiary feedback signal transmission process in FIG. 24.

FIG. 30 is a conceptual diagram illustrating the first embodiment of the tertiary feedback signal transmission process in FIG. 24.

In the tertiary feedback signal transmission process of FIG. 30, the terminal 3040 may receive 4 beams including SSB 10 to SSB 13 from smart repeater 2 3030, measure the received signal strength of each beam, acquire the SSB index of 13 in the beam having the highest received signal strength, and feeds back the index to smart repeater 2 3030. Then, smart repeater 2 3030 may receive index 13 of the SSB received with the highest received signal strength at the terminal 3040. Accordingly, smart repeater 2 3030 may recognize the beam carrying the corresponding SSB index as the best beam (i.e., the best smart repeater 2 beam).

Smart repeater 2 3030 may also forward to smart repeater 1 3020 the feedback with index 13 of the SSB having the highest received signal strength at terminal 3040. Accordingly, smart repeater 3020 may recognize the beam carrying the corresponding SSB index as the best beam (i.e., the best smart repeater 2 beam). Then, smart repeater 1 3020 may forward the feedback with index 13 of the SSB having the highest received signal strength, which is received from smart repeater 2 3030, to the base station 3010. Accordingly, the base station 3010 may recognize the beam carrying the corresponding SSB index as the best beam (i.e., the best smart repeater 2 beam).

With reference back to FIG. 24, the base station may identify, at step S2407, the best beam direction of the base station toward the terminal and the best beam directions of smart repeater 1 and smart repeater 2 toward the terminal based on the SSB index obtained by transmitting the primary SSB set, the SSB index obtained by transmitting the secondary SSB set, and the SSB index obtained by transmitting the tertiary SSB set. Here, the sub-SSB set transmission processes of FIG. 24 may have various other embodiments.

As described above, the present application may propose a terminal initial access process, i.e., a best beam search process in a communication network including a smart repeater supporting multiple beams. In addition, the present application may propose a frame structure capable of supporting such an initial access process. In more detail, the present application may propose a structure and transmission process of a signal used for initial access (e.g., SSB of 5G NR) in the entire transmission frame and an operation and control method of a smart repeater therefor.

In addition, the present application may propose a method of searching for the best beam in a dual beamforming structure including a smart repeater (a dual structure of base station beamforming and smart repeater beamforming). Through this, the communication network can extend communication coverage via the smart repeater. That is, the communication network employing smart repeaters may determine the optimal base station beam and smart repeater beam through the proposed frame structure and initial access method. The method proposed in this application may maintain compatibility with the existing 5G NR by allowing to find the best beams of the base station and smart repeater in a dual beamforming structure while maintaining, as much as possible, the 5G NR frame structure designed without consideration of the existing smart repeater.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first device in a communication system, the method comprising:
receiving, at a second device, a primary synchronization signal block (SSB) including first SSBs for the first device;
feeding back to the second device an index of a first SSB with a highest received signal strength among the first SSBs of the first SSB set;
receiving, at the second device, a second SSB set including the first SSBs for the first device and second SSBs for a third device;
relaying to the third device the second SSBs for the third device in the second SSB set received from the second device; and
relaying an index of a second SSB with a highest received signal strength among the second SSBs to the second device, the index being received from the third device,
wherein the first device is a first smart repeater, the second device is at least one of a base station and the third device is a terminal.

2. The method of claim 1, wherein the first device receives from the second device the second SSBs for the third device through a beam corresponding to the index of the first SSB.

3. The method of claim 1, wherein the second SSBs are relayed to the third device using different beams.

4. The method of claim 1, further comprising
relaying, at the first device, the second SSBs to the third device using different beams and an SSB having the index of the first SSB among the first SSBs to the third device using one of the beams.

5. The method of claim 1, further comprising
relaying, at the first device, the second SSBs to the third device using different beams and the first SSBs to the third device using one of the beams.

6. An operation method of a base station in a communication system, the method comprising:
transmitting a first primary synchronization signal block (SSB) set including first primary SSBs to a first device;
receiving from the first device an index of a first primary SSB with a highest received signal strength of the first device among the first primary SSBs of the first primary SSB set;
transmitting a second primary SSB set including the first primary SSBs and second primary SSBs for a second device to the first device;
receiving from the first device an index of a second primary SSB with a highest received signal strength measured by the second device among the second primary SSBs;
identifying a direction of a first best beam toward the first device using the index of the first primary SSB; and
identifying a direction of a second best beam toward the second device using the index of the second primary SSB,
wherein the first device is a first smart repeater and the second device is a terminal.

7. The method of claim 6, wherein the second primary SSB sets further comprises second secondary SSBs for a fourth device, and the method further comprising:
- transmitting the first primary SSB set including the first primary SSBs to a third device;
- receiving an index of a first secondary SSB with a highest received signal strength of the third device among the first primary SSB set including the first primary SSBs;
- transmitting the first primary SSBs and the second primary SSB set to the third device;
- receiving from the third device an index of a second secondary SSB with a highest received signal strength among the second secondary SSBs;
- identifying a third best beam toward the third device using the index of the first secondary SSB; and
- identifying a fourth best beam toward the fourth device using the index of the second secondary SSB.

8. The method of claim 6, further comprising:
- transmitting to the third device the first primary SSB set including the first primary SSBs;
- receiving from the third device an index of a first tertiary SSB with a highest received signal strength of the third device among the first primary SSBs of the first primary SSB set;
- transmitting to the third device a second secondary SSB set including the first primary SSBs and the second secondary SSBs for the fourth device;
- receiving from the third device an index of a second tertiary SSB with the highest received signal strength among the second secondary SSB;
- identifying a direction of a fifth best beam toward the third device using the index of the first tertiary SSB; and
- identifying a direction of a sixth best beam toward the fourth device using the index of the second tertiary SSB.

9. The method of claim 8, wherein the second primary SSB set and the second secondary SSB set are transmitted at the same SSB set interval in different frequency bands.

* * * * *